AUTOMOTIVE POWER-TRANSMITTING SYSTEM AND MECHANISM

Original Filed Sept. 29, 1945 11 Sheets-Sheet 1

AUTOMOTIVE POWER-TRANSMITTING SYSTEM AND MECHANISM

Original Filed Sept. 29, 1945 11 Sheets-Sheet 2

INVENTOR:
GLENN T. RANDOL,
BY P. N. Lamphere
ATTORNEY.

AUTOMOTIVE POWER-TRANSMITTING SYSTEM AND MECHANISM

Original Filed Sept. 29, 1945 11 Sheets-Sheet 3

INVENTOR:
GLENN T. RANDOL,
BY P. N. Lamphere
ATTORNEY.

AUTOMOTIVE POWER-TRANSMITTING SYSTEM AND MECHANISM

Original Filed Sept. 29, 1945 11 Sheets-Sheet 4

INVENTOR:
GLENN T. RANDOL,
BY P. H. Lamphere
ATTORNEY.

AUTOMOTIVE POWER-TRANSMITTING SYSTEM AND MECHANISM

Original Filed Sept. 29, 1945 11 Sheets-Sheet 5

INVENTOR:
GLENN T. RANDOL,

BY P. W. Lamphere

ATTORNEY.

AUTOMOTIVE POWER-TRANSMITTING SYSTEM AND MECHANISM
Original Filed Sept. 29, 1945 11 Sheets-Sheet 6
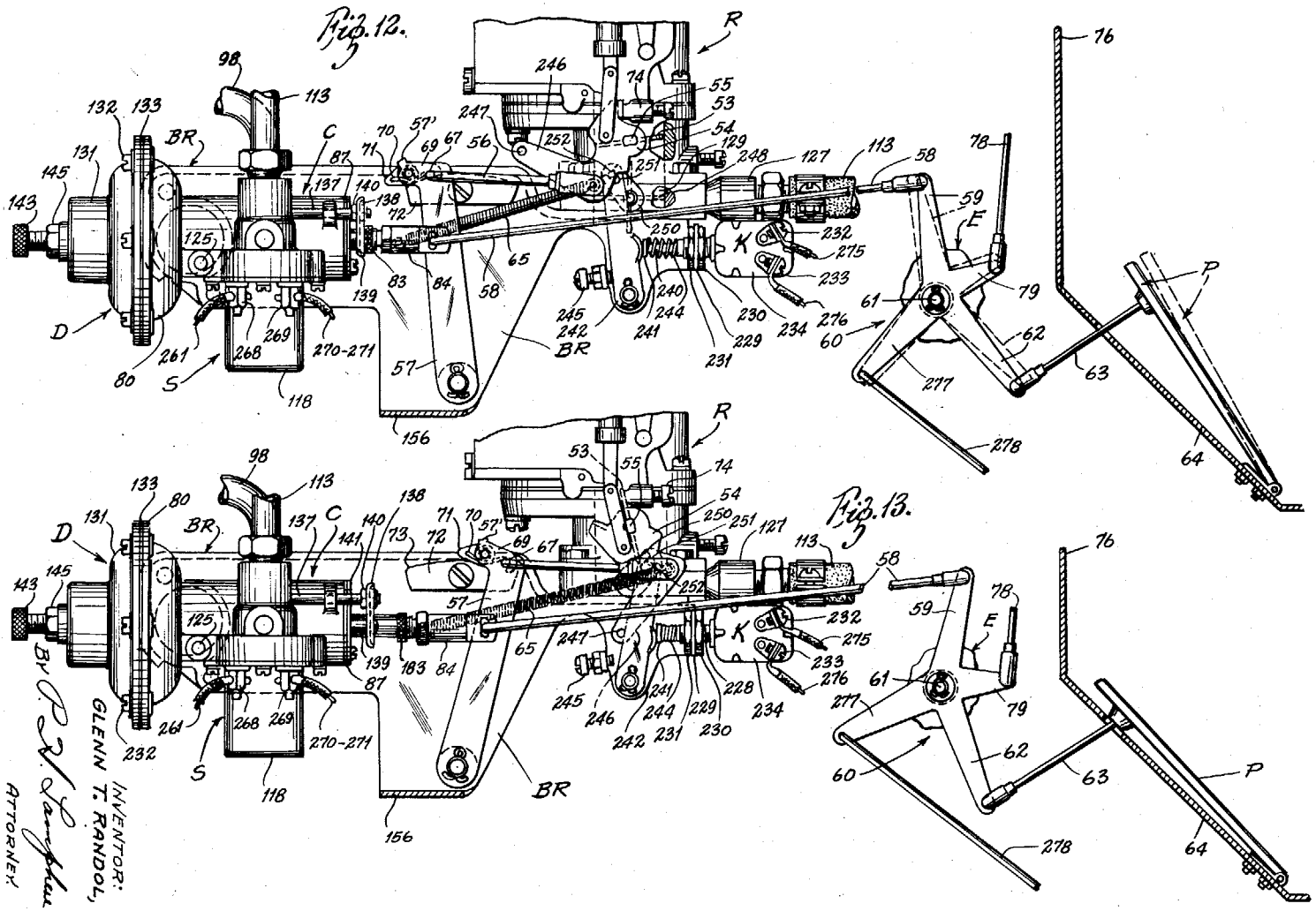

AUTOMOTIVE POWER-TRANSMITTING SYSTEM AND MECHANISM

Original Filed Sept. 29, 1945 11 Sheets-Sheet 7

INVENTOR:
GLENN T. RANDOL,
BY P. W. Lamphere
ATTORNEY.

AUTOMOTIVE POWER-TRANSMITTING SYSTEM AND MECHANISM

Original Filed Sept. 29, 1945 11 Sheets-Sheet 8

INVENTOR:
GLENN T. RANDOL,
BY P. N. Lamphere
ATTORNEY.

AUTOMOTIVE POWER-TRANSMITTING SYSTEM AND MECHANISM

Original Filed Sept. 29, 1945 11 Sheets-Sheet 9

INVENTOR:
GLENN T. RANDOL,
BY P. H. Lamphere
ATTORNEY.

AUTOMOTIVE POWER-TRANSMITTING SYSTEM AND MECHANISM
Original Filed Sept. 29, 1945 11 Sheets-Sheet 10
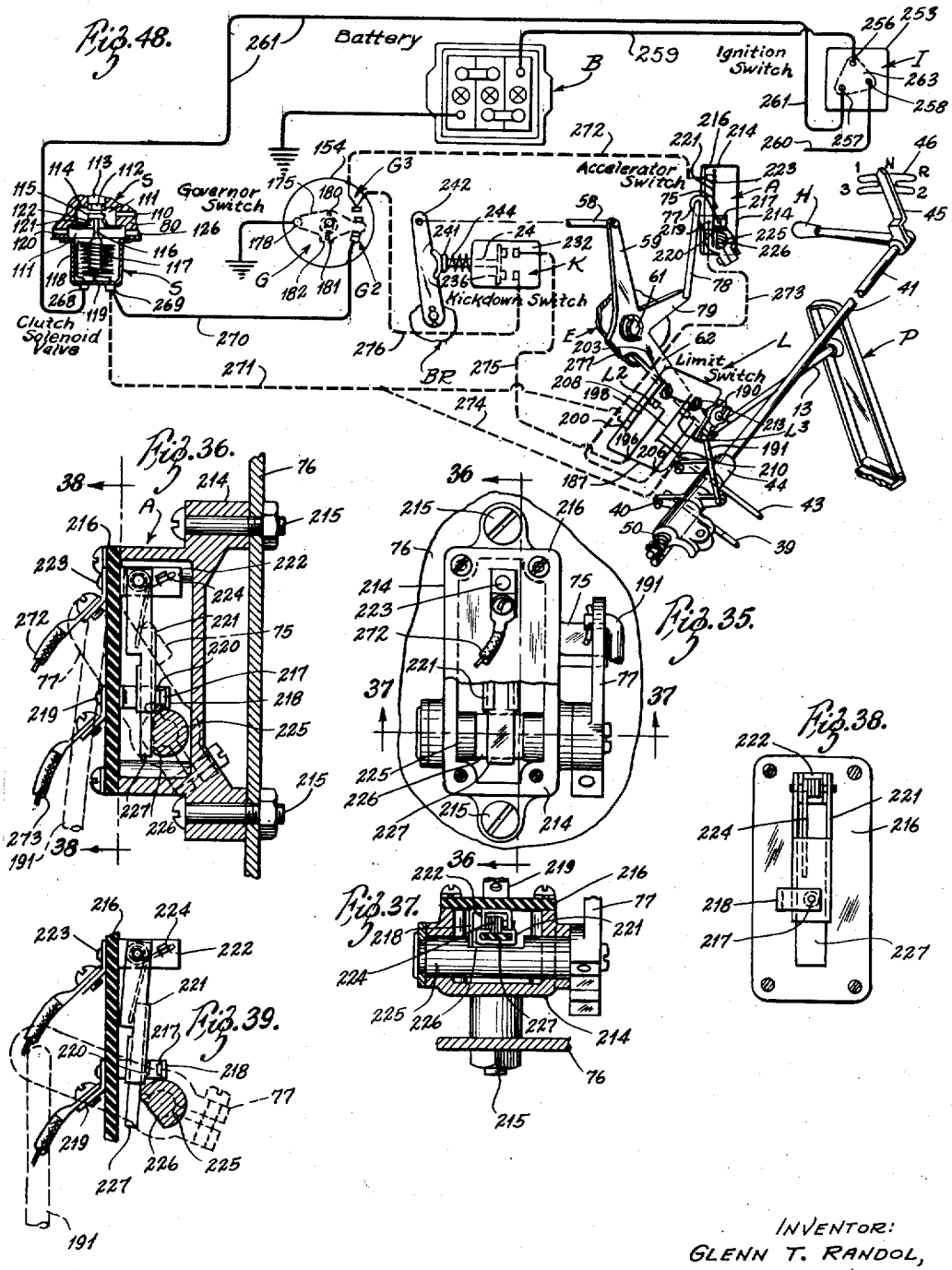
INVENTOR:
GLENN T. RANDOL,
BY P. L. Lamphere
ATTORNEY.

AUTOMOTIVE POWER-TRANSMITTING SYSTEM AND MECHANISM
Original Filed Sept. 29, 1945 11 Sheets-Sheet 11
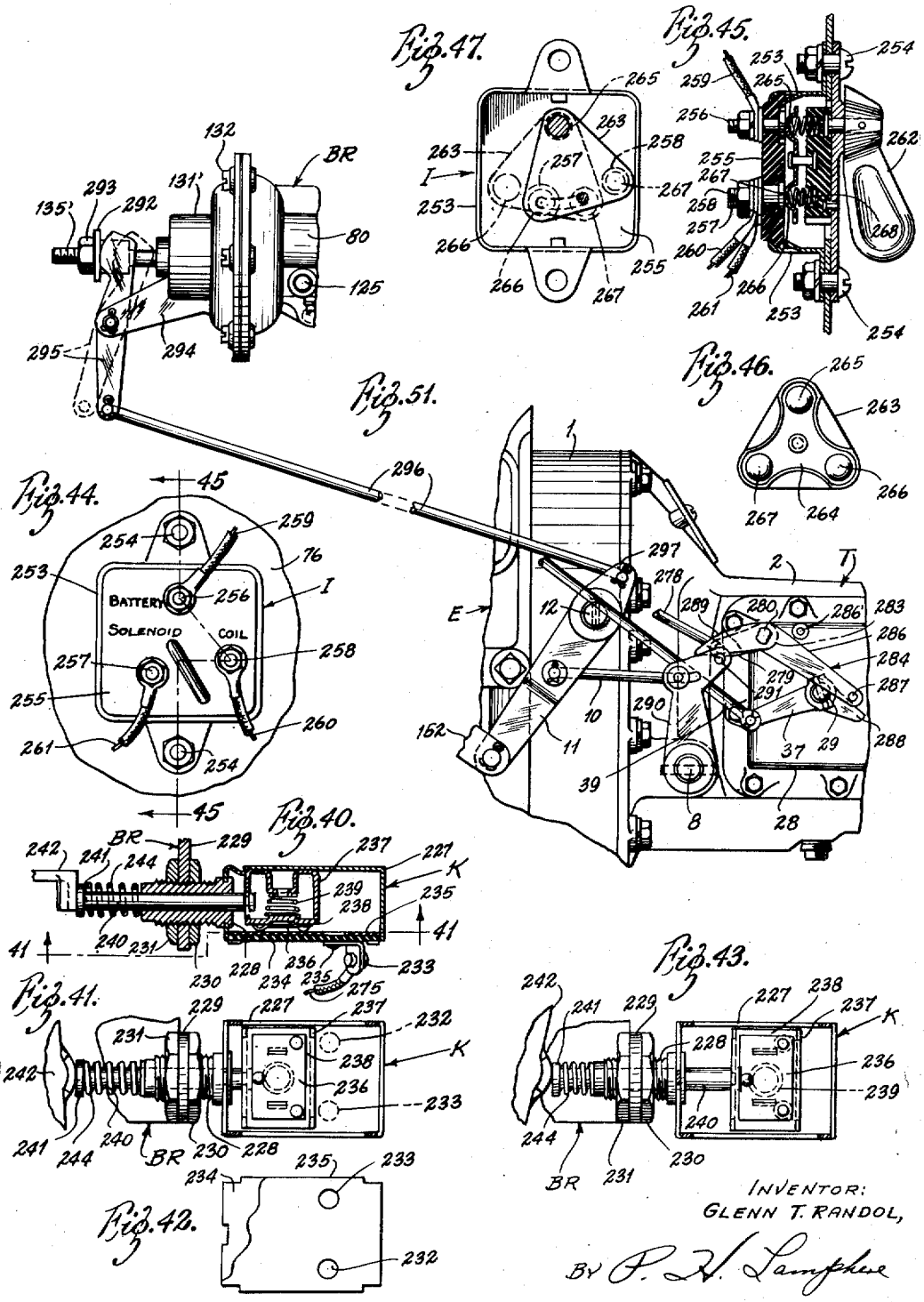
INVENTOR:
GLENN T. RANDOL,
BY P. L. Lamphere
ATTORNEY Reissued Aug. 4, 1953

UNITED STATES PATENT OFFICE 23,695

AUTOMOTIVE POWER-TRANSMITTING SYSTEM AND MECHANISM

Glenn T. Randol, Mountain Lake Park, Md.

Original No. 2,597,840, dated May 20, 1952, Serial No. 619,365, September 29, 1945. Application for reissue July 31, 1952, Serial No. 302,025

32 Claims. (Cl. 192—.052)

Matter enclosed in heavy brackets [ ] appears in the original patent but forms no part of this reissue specification; matter printed in italics indicates the additions made by reissue.

This invention relates to control means for power-transmitting means for automobiles and the like, and more particularly, that type which embodies a motor power-operated device controllable by the accelerator mechanism of an associated motor vehicle, and arranged to cause operation of only the friction clutch of such transmitting systems or both the clutch and an associated change-speed [*comprising such*] gearing systems if desired.

In prior types of motor power-operated devices employed for controlling motor vehicle friction clutches to accommodate changes in gear ratios of an associated change-speed gearing, either automatically or manually, the control valve mechanism therefor generally embodies either follow-up valve mechanism or bleed-off valve mechanism for controlling the engagement of the clutch. These control valve mechanisms are under the control of the accelerator mechanism and the arrangement is such that when the accelerator mechanism is fully released *into engine idling position*, the clutch will be automatically disengaged to facilitate a change in drive ratio. Upon depressing the accelerator mechanism, following a change in drive ratio, the re-engagement of the clutch is so attempted to be controlled as to automatically accomplish a smooth clutch engagement. In both types of clutch control mechanisms above referred to the desirable clutch re-engagement attempted to be accomplished under control of the accelerator mechanism is not possible under all conditions since it is too dependent upon the timed manipulation of the accelerator pedal by the operator of the vehicle.

In prior control mechanisms wherein a bleed-off valve is employed to control the rate of re-engagement of the clutch, the operator must so carefully depress the accelerator pedal as to obtain correctly timed bleed-off conditions before smooth clutch re-engagement can occur. It is thus easily possible for the operator to depress the accelerator too rapidly, particularly in the lower speeds, and thus "dump" the clutch by "over-shooting," with the accelerator mechanism, the initial frictional engaging point of the clutch elements.

When a follow-up value mechanism is employed, some of the inefficiencies and disadvantages of the bleed-off valve arrangement are eliminated, this being accomplished by taking part of the control away from the operator [and] *by* making the follow-up valve operate in coordination with the extent *and rate* of depressing the accelerator pedal [and with] *causing* the differential fluid pressure [effective in] *to correspondingly actuate* the fluid pressure motor [controlling] *to control* the clutch. It is nevertheless, possible in such control mechanisms employing the follow-up type of valve to "dump" the clutch by a too rapid depressing of the accelerator pedal which will nullify the follow-up valve action. There is no function in such control mechanism which will prevent the operator by so depressing the accelerator pedal from obtaining undesirable engaging action of the clutch, particularly [after the time of] *following* initial frictional contact of the clutch elements. The control mechanism embodying the follow-up valve functions very successfully in obtaining proper control or re-engagement of the clutch up to the point [where] *wherein* the clutch elements initially contact, but after [this] *such initial "slipping" engagement* it is still under the control of the operator by the extent and rapidity of depressing accelerator pedal and thus it is very easy for the operator to depress the accelerator pedal too rapidly and "dump" the clutch so that there will be a too rapid engagement of the clutch elements to full operative condition [and consequently a] *with consequent* "jerking" of the vehicle in starting. If the accelerator mechanism is attempted to be controlled accurately to obtain smooth clutch engagement it is possible that the engine will not be speeded up sufficiently at the time of clutch re-engagement, thus stalling the engine. The "dumping" of the clutch may also cause "grabbing," thereby stalling of the engine and imposing severe strain on the vehicle driving parts. Racing of the engine prior to *full* clutch engagement may also be present.

In accordance with my invention, I have eliminated the well known objections to the prior *art* types of clutch control mechanisms by improving the type of control mechanism embodying the follow-up valve, such improvement comprising structure so associated with the follow-up valve that the full engagement of the clutch elements is brought about after initial frictional contact [of the clutch element] *thereof* without any dependence on any particular mode of operation of the accelerator mechanism. In other words, the arresting or retarding of the movement of the clutch elements at substantially the initial frictional contact of said elements is so automatically controlled independently of operation of the accelerator mechanism that smooth clutch engagement *always* results without the vehicle operator having to perform any particular control "touch" on the accelerator pedal. With my improved control mechanism the engagement of the clutch may be properly modulated, that is, have its extent *and rate* of engagement properly varied so as to accomplish rapid and smooth engagement to full operating condition. The modulation is in accordance with accelerator pedal movement up to a predetermined point, and thereafter it is automatic and not dependent on any particular mode of operation of the pedal.

One of the principal objects of my invention is to provide a fluid pressure operated device and *associated* control means for controlling the disengaging of a [main] friction clutch and its engaging by manipulation of the accelerator mechanism whereby there will be accomplished smooth clutch engagement after a predetermined point during clutch engagement without dependence upon any particular mode of operation of the accelerator mechanism.

Another object is to so combine the clutch control structure with a speed-responsive device and the control means for an associated change-speed gearing, that the clutch will be properly controlled during ratio changing, so that a vehicle can be driven efficiently with a minimum of effort and manipulation of control members.

Still another object is to produce a control mechanism for a motor power-operated device having a movable *power* element, and which has embodied therein an improved follow-up mechanism so controllable by the energized condition of the power-operated device and a [manually] *pedally*-controlled member, that said follow-up mechanism will be effective only to control the releasing movement of the movable element of the power-operated device to a predetermined point, regardless of the manipulation of the [manually] *pedally*-controlled member.

A further object is to associate with the follow-up mechanism additional mechanism for automatically controlling the *clutch* releasing movement of the movable element of the motor power-operated device after the predetermined point is reached and in accordance with the extent *and rate* of releasing movement.

Yet a further object is to produce an improved friction clutch controlling mechanism of the type embodying a follow-up valve controllable by the accelerator mechanism of an *associated* internal-combustion engine and the degree of energization of the fluid pressure motor employed to actuate the clutch.

A further object is to associate with a follow-up valve mechanism employed to control a fluid pressure actuated motor during clutch engagement *thereby*, a dampening valve means which will automatically control the engagement of the clutch elements to full operative condition after a predetermined point is attained in the clutch engaging operation, and independently of the relative positions the elements of the follow-up valve may *operatively* assume.

A further object is to produce a clutch control mechanism which will embody both a follow-up valve and a dampening valve for controlling the engagement of the clutch by a motive fluid actuating motor to thus obtain a smooth clutch engagement without any special operation of a [manually] *personally*-controlled member employable to initiate clutch disengagement and the engagement by *other* means of the control mechanism.

A more specific object is to so combine the follow-up valve and the dampening valve that one of the elements of the follow-up valve will serve as the movable valve element of the dampening valve to thereby produce a simple and inexpensive control valve structure.

A further object is to so associate the dampening valve with the follow-up valve that the former can be controlled either by the differential fluid pressure effective on the movable element of the fluid actuated motor operatively connected to control the clutch, or by mechanical means operatively connected to be controlled by the extent of engagement of the clutch elements during movement to full operative clutch engagement.

A further object is to provide in a control mechanism for a fluid motor actuated friction clutch controllable by the accelerator, and having a follow-up valve for controlling the engagement of the clutch elements when the accelerator mechanism is moved from released *engine idling* position, means whereby the function of the follow-up valve may be eliminated and the clutch caused to disengage and immediately re-engage when the accelerator mechanism is moved to a position within limits substantially at the end of its engine operative range.

A further object is to so design a follow-up valve for use in a friction clutch control mechanism operable from the accelerator mechanism that an element thereof can be employed to cause the fluid pressure motor operatively connected to the clutch to operate to disengage the clutch and control its immediate re-engagement when the accelerator mechanism is moved to a position within limits substantially at the end of its engine operative range, and without release of the accelerator mechanism.

A further object is to produce a friction clutch control mechanism for an automotive vehicle which will cause quick clutch disengagement upon release of the accelerator mechanism of the engine to thus accommodate selective ratio changing of the gearing, and upon the completion of said ratio changing to allow quick re-engagement of the clutch independent of control of the accelerator mechanism.

Yet a further object is to provide an accelerator-operated friction clutch control mechanism and so associate it with a change-speed gearing control means, that when the gearing is in a predetermined speed ratio the clutch may be disengaged automatically by release of the accelerator mechanism to engine idling position and immediately controlled to automatically re-engage following a change to a new speed ratio.

A further object is to provide a motor vehicle with a control means whereby the operator may properly control the disengagement of the associated friction clutch and its smooth re-engagement by release and depression of the accelerator pedal when certain speed [ratios] *drives* are selectively established, and to control disengagement of the clutch by release of the accelerator pedal and automatic quick re-engagement thereof upon the selective establishment of higher speed [ratios] *drives*.

Another object is to provide a motor vehicle with control means whereby the operator may control the vehicle in the manner above set forth and additionally enable the operator, by a full depressing of the accelerator pedal, to cause disengagement of the clutch, to automatically change the gear ratio from a higher speed to a lower speed and to accommodate quick automatic re-engagement of the clutch without release of the accelerator pedal from its fully depressed position.

Still another object of the invention is to provide a fluid pressure operated device for disengaging and controlling re-engagement of a vehicle friction clutch, and to control said device in accordance with certain predetermined conditions of the vehicle engine accelerator mechanism, a speed-responsive means and a change-speed transmission *drivingly* associated with the clutch.

Another object related to that last stated is to provide a clutch control device which will be under the control of the accelerator pedal to cause the clutch to disengage, either in full released or full depressed position of the accelerator mechanism, and also so arranged that the selective shifting of associated gearing speed ratios can be effected in either extreme position of the accelerator pedal.

A further specific object is to provide a control means for a motor vehicle which will be so connected to the [main] *engine* friction clutch and controllable by the accelerator mechanism, the control means for the change-speed gearing and the speed of the vehicle, that the operator can accomplish gear ratio changing in a simple and efficient manner for all conditions that may be encountered in driving the vehicle.

Other objects of the invention will become apparent from the following description taken in connection with the accompanying drawings showing, by way of example, vehicle control means embodying the invention.

In the drawings:

Figure 1 is a side view, with some parts in section, of a portion of a vehicle showing my improved control mechanism associated with the engine, its accelerator mechanism, the power-transmitting friction clutch and the change-speed gearing, said control mechanism having its parts in positions assumed when the vehicle is stopped with the engine not running, the clutch engaged and the gearing in neutral condition;

Figure 11 is a top plan view of the control mechanism structure shown in Figure 8;

Figure 12 is a view similar to Figure 8, but showing the positions assumed by the parts upon initial depressing of the accelerator pedal to [begin] *inaugurate* the clutch engaging follow-up action;

Figure 16:
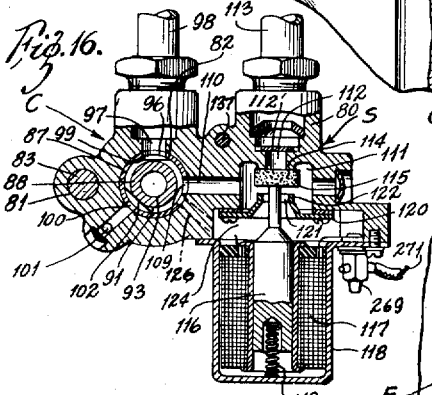
Figure 3:
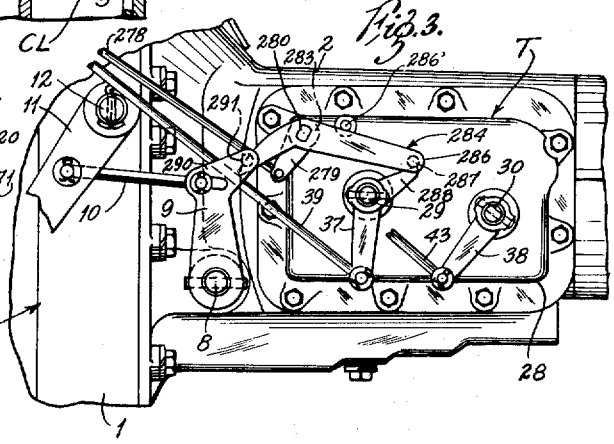
Figure 3 is a view similar to Figure 2, but showing the position of the parts when high gear ratio is established with the friction clutch disengaged.
Figure 9:
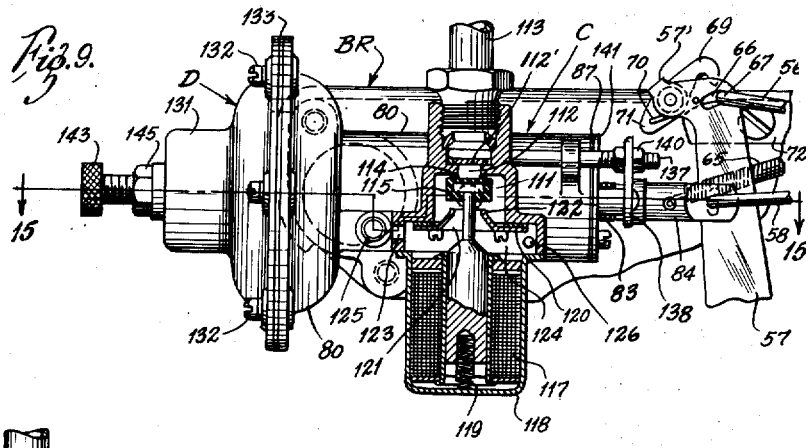
Figure 9 is an enlarged partial sectional view of a portion of the structure of Figure 8, showing details of the solenoid-controlled valve in its closed position.
Figure 14:
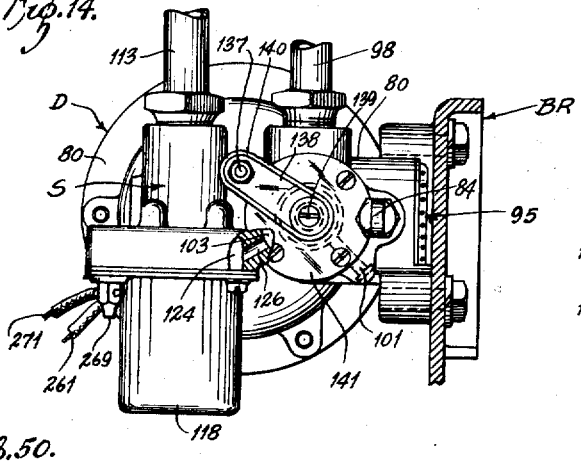
Figure 10:
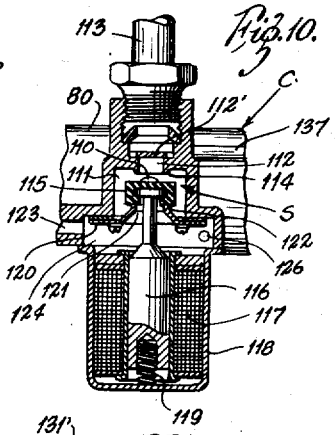
Figure 10 is a sectional view of the solenoid valve showing it in open position with the solenoid energized.
Figure 15:
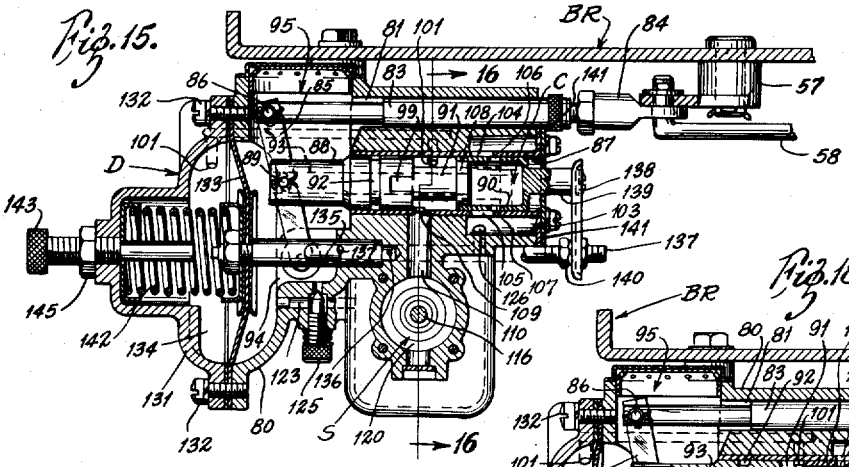
Figure 18:
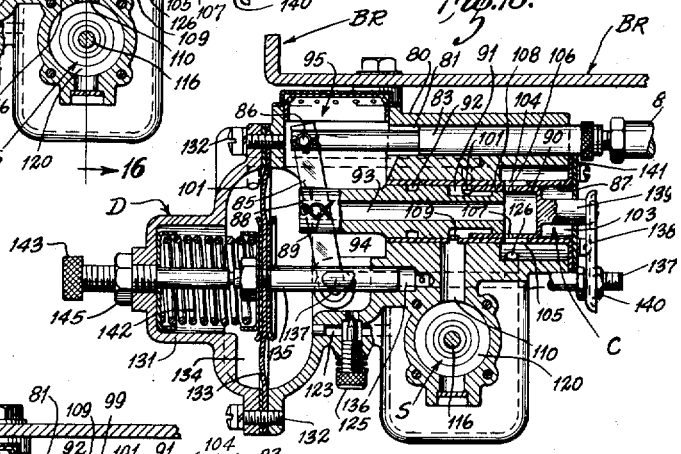
Figure 19:
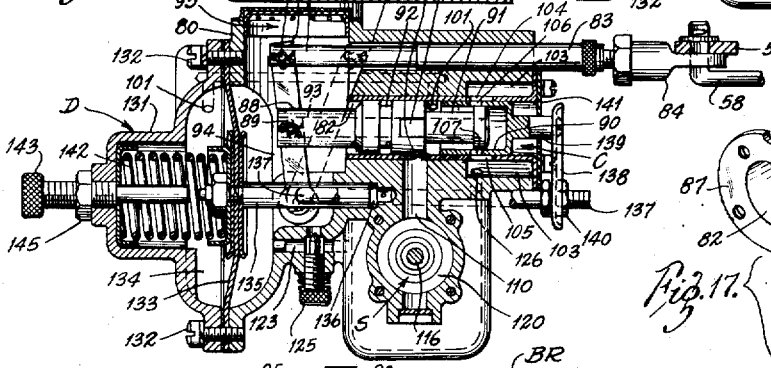
Figure 17:
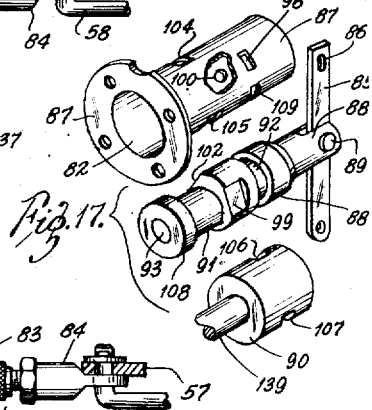
Figure 20:
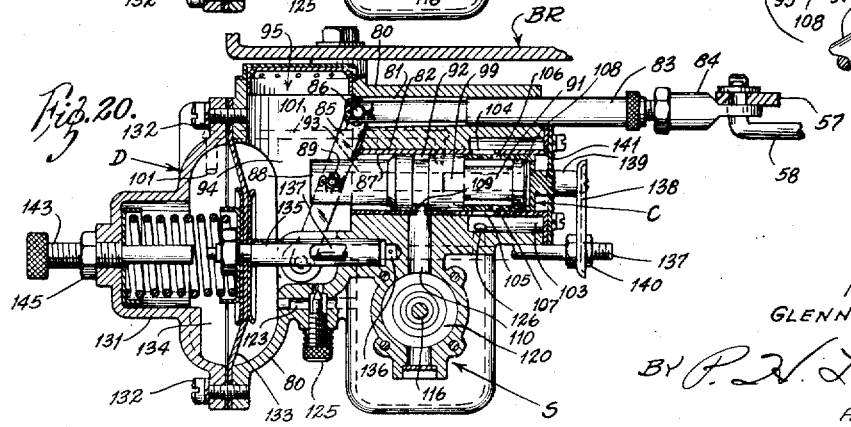

Figure 13 is a view similar to Figure 12, showing the position assumed by the parts when the accelerator pedal is depressed within limits of wide open throttle position and known as the "kick-down" operation whereby the clutch may be disengaged and a shift to second gear automatically made following which, automatic re-engagement of the clutch will occur without changing the position of the accelerator pedal;

Figure 14 is a front end view of my improved clutch control mechanism showing the manner in which it is mounted on the supporting bracket;

Figure 15 is a longitudinal sectional view taken on the line 15—15 of Figure 9;

Figure 16 is a cross sectional view taken on the line 16—16 of Figure 15;

Figure 17 is an exploded perspective view of the parts of the combined follow-up and dampening valve elements;

Figure 18 is a sectional view similar to Figure 17 showing the positions of the parts when the engine is running and the follow-up-dampening valve element is moved to its initial follow-up position by the diaphragm motor;

Figure 19 is a sectional view similar to Figure 18, but showing another position of the follow-up valve elements resulting from further depressing the accelerator to increase the engine speed and wherein the follow-up action is initiated to cause the clutch elements to begin moving toward their engaged positions;

Figure 20 is a sectional view similar to Figure 19, but showing the positions of the parts when the accelerator pedal is positioned to perform the "kick-down" operation, which position is within limits of wide open throttle.

Figure 1:
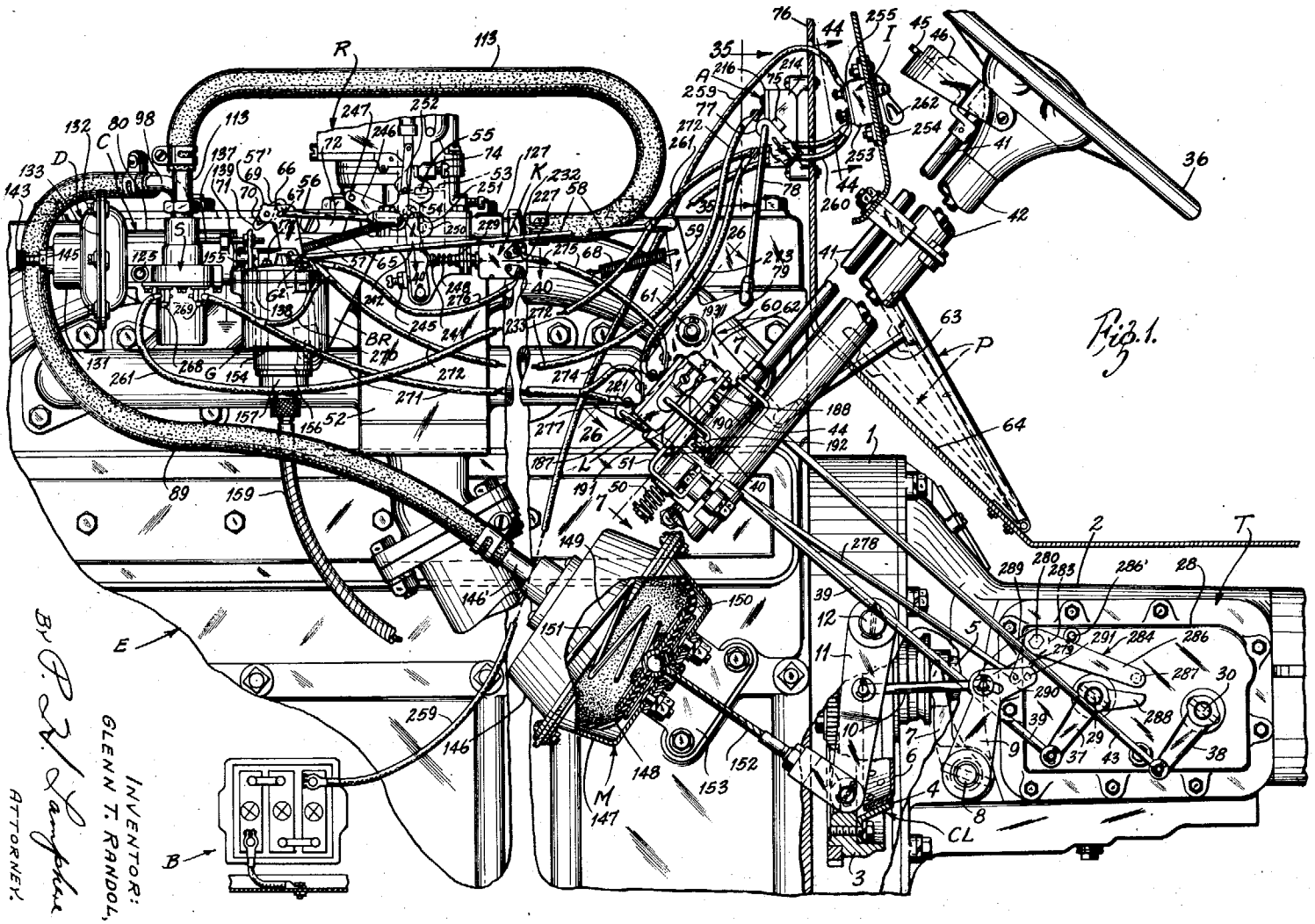
Figures 4, 5, 7:
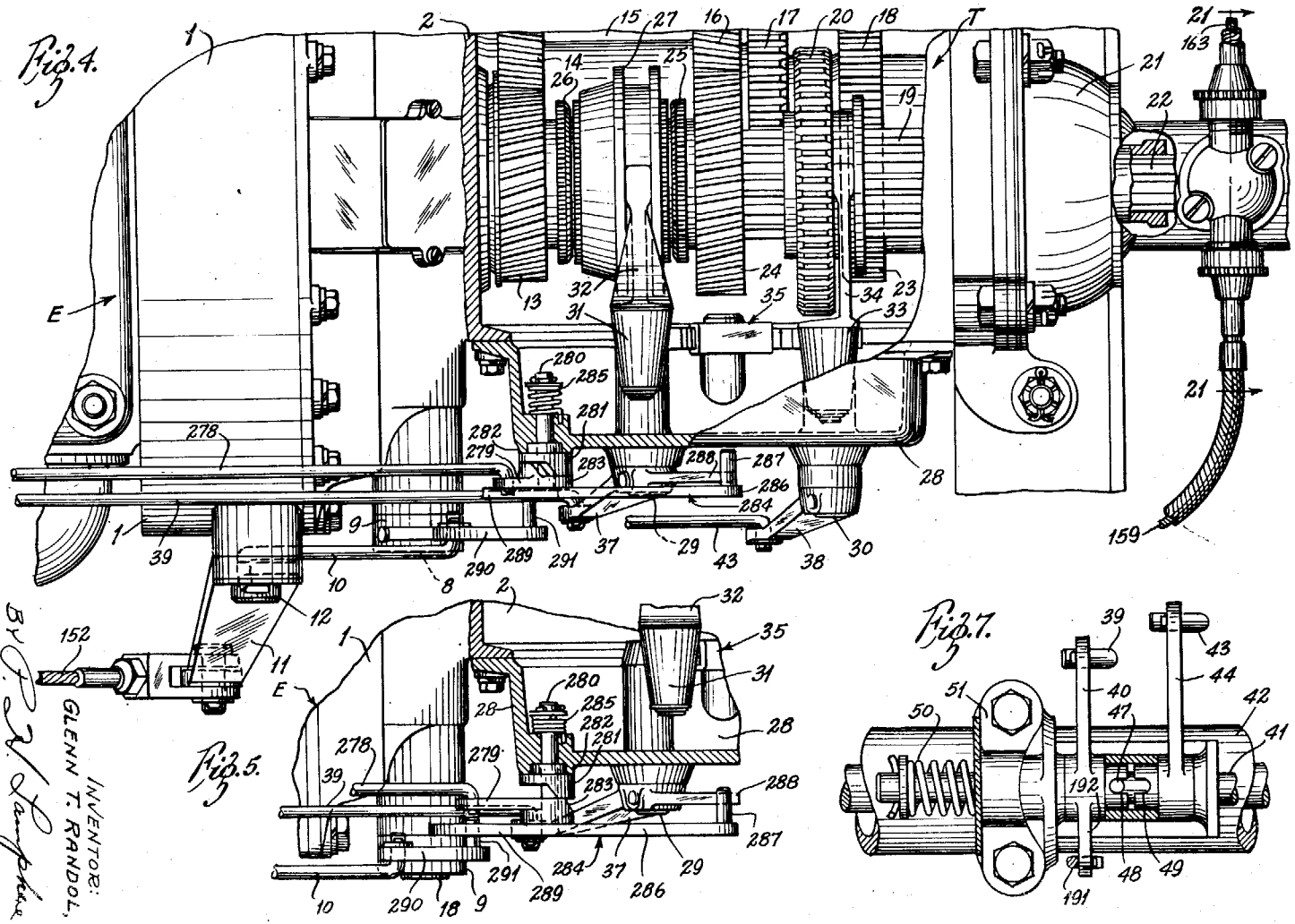
Figure 4 is a top view of the change-speed gearing and associated control mechanism, together with the governor driving connection, said gearing being in neutral condition.
Figure 5 is a view of a portion of the structure of Figure 4, showing the position of the parts when second gear is engaged and the engine clutch disengaged.
Figure 7 is a view of the gear shifting arms and associated structure at the lower end of the gear shifting control shaft on the steering column, said view being taken on the line 7—7 of Figure 1.
Figure 22:
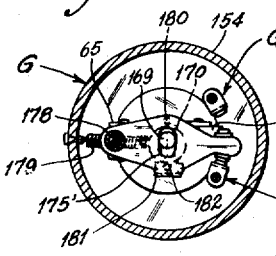
Figure 25:
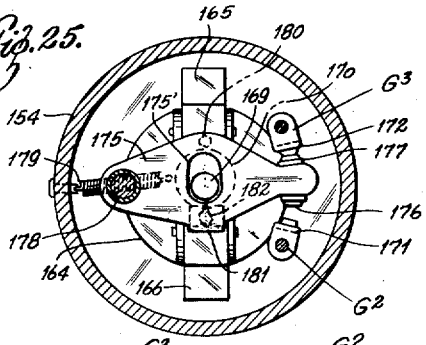
Figure 21:
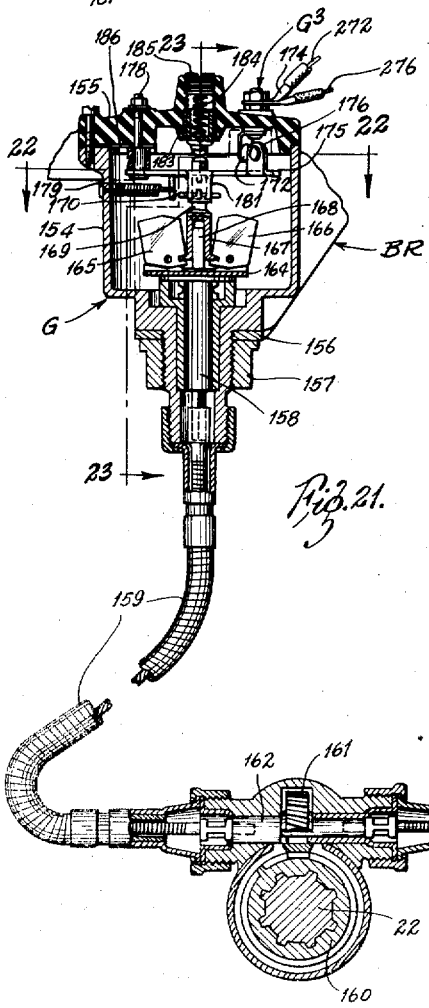
Figure 23:
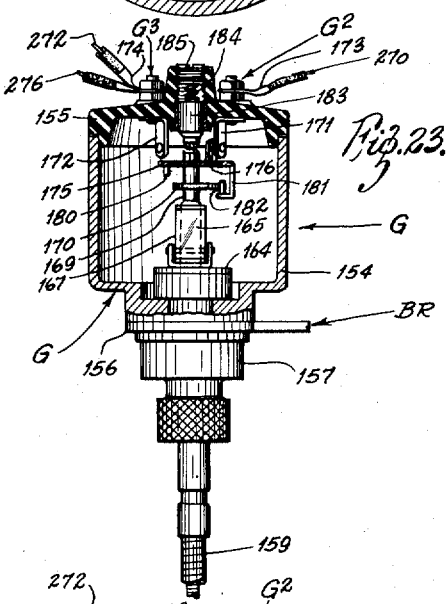
Figure 24:
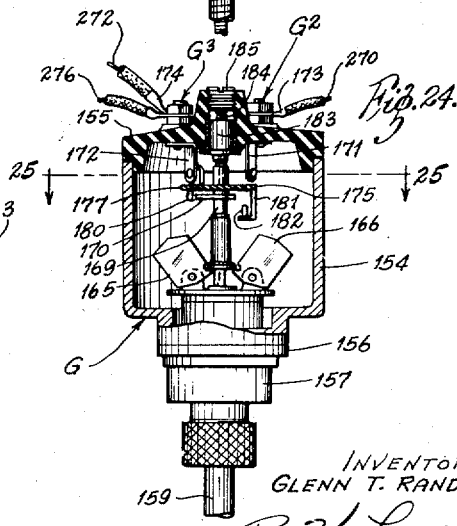
Figure 26:
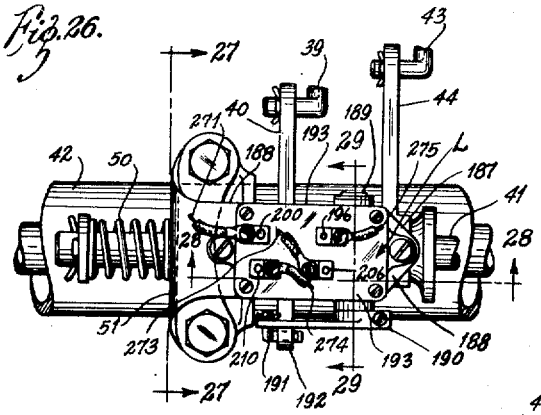

Figure 21 is a sectional view of my improved centrifugal two-stage governor switch and its driving connection with the vehicle propeller shaft, said governor [section] *sectional* view being taken on the line 21—21 of Figure 11 and said driving connection sectional view being taken on the line 21—21 of Figure 4;

Figure 22 is a sectional view taken on the line 22—22 of Figure 21;

Figure 23 is a sectional view taken on the line 23—23 of Figure 21 showing details of the over-center spring actuated contact element;

Figure 24 is a sectional view similar to Figure 23, but showing the position of the switch double contact element when the speed of the car is above approximately 5 to 7 miles per hour;

Figure 25 is an enlarged sectional view taken on the line 25—25 of Figure 24;

Figure 26 is a top plan view taken as indicated by the line 26—26 of Figure 1 showing the mounting of the limit switch and the connection between the second and the high gear shifting arms and the cam for controlling the two switch contacts.

Figure 50:
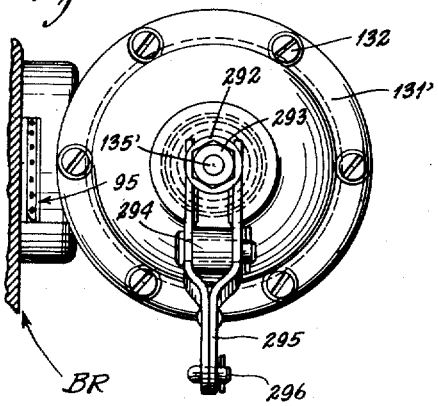
Figure 49:
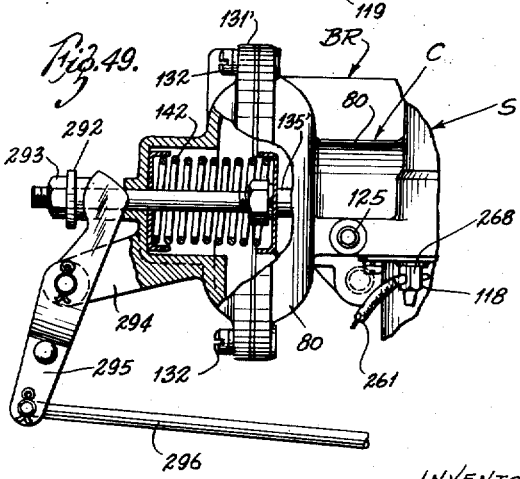
Figure 27:
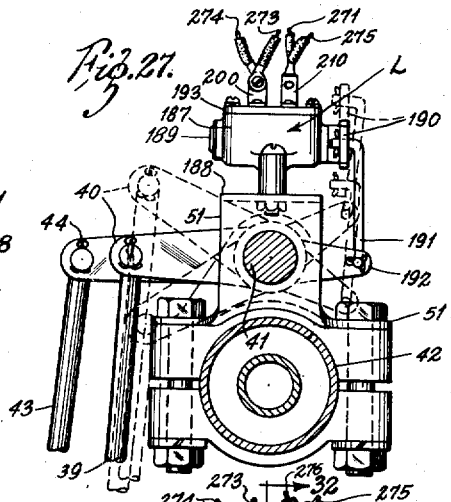
Figure 28:
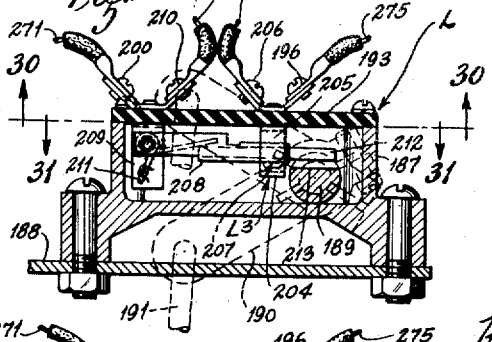
Figure 29:
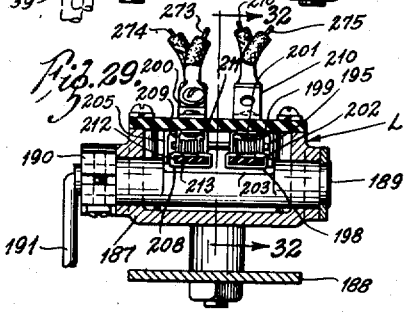
Figure 32:
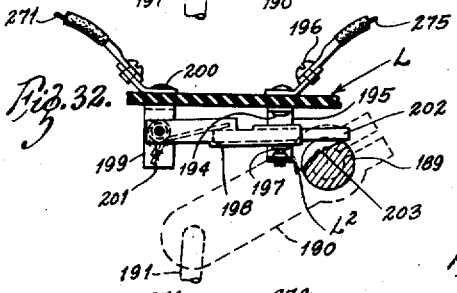
Figure 30:
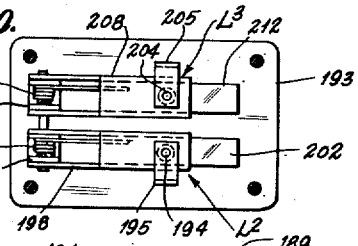
Figure 31:
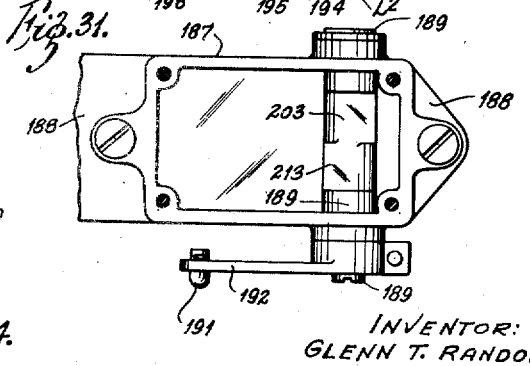
Figure 33:
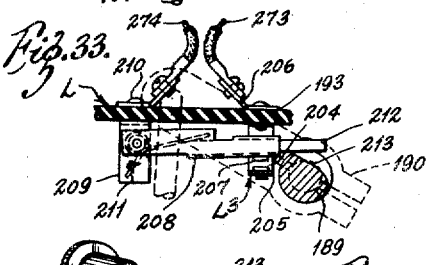
Figure 34:
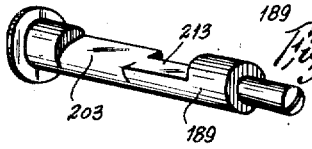

Figure 27 is a front end view taken on the line 27—27 of Figure 26;

Figure 28 is a longitudinal sectional view taken on the line 28—28 of Figure 26;

Figure 29 is a cross sectional view taken on the line 29—29 of Figure 26;

Figure 30 is a view taken on the line 30—30 of Figure 28 showing in particular the mounting of the cam actuated contacts;

Figure 31 is a view taken on the line 31—31 of Figure 28 with the cover and associated parts removed to thus show details of the switch cam member;

Figure 32 is a view showing the second speed ratio limit switch contacts and associated cam in switch open positions;

Figure 33 is a view showing the high speed ratio limit switch contacts and associated cam in switch open positions;

Figure 34 is a perspective view of the cam for controlling the limit switch movable contacts;

Figure 35 is a view, taken from the line 35—35 of Figure 1, of the accelerator switch, a portion of the cover being broken away to show the movable contact member and the cam for actuating same, said contact member being in closed position;

Figure 36 is a vertical sectional view taken on the line 36—36 of Figure 35;

Figure 37 is a cross sectional view taken on the line 37—37 of Figure 35;

Figure 38 is a view of the fiber cover plate showing the switch contacts, said view being taken on the line 38—38 of Figure 36;

Figure 39 is a view showing the cam member actuated to open the switch contacts;

Figure 40 is a longitudinal sectional view of the "kick-down" switch, said view being taken on the line 40—40 of Figure 1;

Figure 41 is a side view of the "kick-down" switch, taken on the line 41—41 of Figure 40, showing the mounting bracket and the contact members in their open position and also the associated lever for actuating the auxiliary butterfly valve to [closed] *open* position when the accelerator pedal is released;

Figure 42 is a view of the cover plate of the switch and the two contacts carried thereby;

Figure 43 is a side view similar to Figure 41, but showing the positions assumed by the parts when the accelerator pedal is fully depressed, auxiliary butterfly closed and "kick-down" switch circuit energized;

Figure 44 is a view of the ignition switch as viewed on the line 44—44 of Figure 1;

Figure 45 is a vertical sectional view taken on the line 45—45 of Figure 44;

Figure 46 is a view of the movable block and carried contacts of the ignition switch;

Figure 47 is a view of the ignition switch box with the cover plate removed and showing the "open" and "closed" positions of said movable block and carried contacts, the "open" position being shown in dashed lines, as are also the fixed contacts carried by the removed cover plate;

Figure 48 is a schematic illustration of the electrical wiring diagram for controlling my improved clutch control mechanism, together with the various mechanical and electrical units comprising the system, and wherein energized circuits are depicted by solid lines and non-energized circuits are depicted by dashed lines;

Figure 49 is a view of a modified clutch control mechanism wherein the *vacuum*-diaphragm is eliminated and a direct mechanical connection substituted therefor between the follow-up dampening valve and the friction clutch movable element;

Figure 50 is a front end view of the modified structure shown in Figure 49; and

Figure 51 is a view *of the modified structure of Figure 49* showing the hookup with the clutch, said clutch being in full disengaged position and the combined follow-up and dampening valve in its initial restricting position.

Referring to the drawings in detail, and first to Figures 1 to 7, inclusive, there is disclosed in Figure 1 a vehicle internal-combustion engine "E" having a carburetor "R" which is controlled by accelerator mechanism including the pedal "P" positioned in the operator's compartment of the vehicle. The crank shaft of the engine "E" is connected by means of a friction clutch "CL" and a change-speed gearing "T" to drive the wheels of the vehicle through the usual propeller shaft and the differential gearing (not shown).

The friction clutch "CL" is enclosed within a clutch housing 1 attached to the engine and to which is secured the gearing housing 2 containing the change-speed gearing. The crank shaft of the engine drives the fly-wheel 3 which has bolted thereto a cone type clutch element 4. In alignment with the crank shaft is the driving shaft 5 for the gearing and splined on this driving shaft is the movable cone clutch element 6. Springs (not shown) are employed to normally maintain the two clutch elements engaged so that power may be transmitted through the clutch *to the gearing*. The movable clutch element 6 is movable to the clutch disengaged position by a fork 7 secured to a cross shaft 8 journaled in the forward bell portion of the gearing housing. On the outer end of this shaft 8 is an upstanding arm 9 whereby the fork may be actuated. This arm is *operably* connected by a rod 10 to the intermediate part of an arm 11 pivoted on the side of the clutch housing 1 by means of a pin 12. Arm 11 is arranged to be actuated by a fluid pressure servomoter "M" which is for example, illustrated as a suction type and will be described in detail later. The particular cone type clutch illustrated is for the purpose of example only and it is to be understood that any type of friction clutch can be employed in the place of that shown.

The change-speed gearing, shown by way of example, and enclosed in the housing 2 is a conventional sliding gear type. It is best illustrated in Figure 4. The driving shaft 5, coming from the clutch, is journaled in the forward end *wall* of the gearing housing and integrally carries the driving gear 13 for the gearing. This gear 13 constantly meshes with a gear 14 carried by the countershaft 15 for constantly driving said countershaft, and also the second speed gear 16, the low speed gear 17 and the reverse speed gear 18 integral with the countershaft. The driven shaft 19 of the gearing is axially aligned with the driving shaft 5 and has its forward end piloted in said driving shaft and its rear end journaled in the rear *end* wall of the gearing housing 2. The rear portion of this driven shaft has splined thereon the combined low and reverse gear 20 which, when in its neutral position (shown in Figure 4), is positioned between the low and reverse gears on the countershaft. When this gear 20 is moved forwardly; that is, to the left as viewed in Figure 4, it will mesh with the gear 17 to produce low speed drive, and if the countershaft is rotated, power will be transmitted to the driven shaft 19 and [then] *thence* to the wheels of the gearing through the universal joint 21 and the propeller shaft 22 shown in Figure 4.

When the gear 20 is moved rearwardly from the neutral position shown in Figure 4, it will engage with an idler gear 23 constantly in mesh with the gear 18 on the countershaft. This will establish reverse speed drive to the wheels of the vehicle.

Forwardly of the gear 20 there is rotatably mounted on the driven shaft a second speed gear 24 which is in constant mesh with the second speed gear 16 on the countershaft. The forward face of gear 24 carries integral clutch teeth 25. Similarly the rear face of the driving gear 13 carries integral clutch teeth 26. These two toothed clutch elements are spaced apart and mounted therebetween is a double clutch element 27. This clutch element is slidable on the driven shaft and is connected thereto through splines, as is well known construction. When the double clutch element 27 is moved from its neutral position shown in Figure 4 to engage with the clutch teeth 25, the gear 24 will be connected to the driven shaft and with the countershaft so that rotating power will be transmitted to the wheels of the vehicle in second speed ratio. If the double clutch element 27 should be moved forwardly from its neutral position it will engage the teeth 26 and directly connect the driving and driven shafts to obtain direct or high speed drive. The double clutch element 27 and the clutch teeth 25 and 26 generally have associated therewith suitable synchronizing means, but such as not shown *in detail* for the sake of simplicity.

The side of the gearing housing is provided with an opening which is engaged by a cover plate 28 in which are journaled two shifting shafts 29 and 30. On the inner end of the shaft 29 is a shifting arm 31 in which is pivotally mounted a shifting fork 32 for controlling the double clutch element 27 to shift it to its various positions; namely, those to obtain neutral and second and high speed [ratios] *drives*. The inner end of the shaft 30 carries a similar shifting arm 33 in which is pivotally mounted a shifting fork 34 for controlling the combined low and reverse slidable gear 20 to shift to its various positions; namely, neutral and low and reverse [speed] *gear* ratio positions. Associated with the shifting arms 31 and 32 is a suitable gear position detent and interlocking structure 35 [so as] *effective* to prevent either the gear 20 or the double clutch element 27 from being shifted when the other is in a [speed] *gear* ratio operative position.

The gearing may be controlled in any suitable manner but, as shown, is arranged to be manually-controlled in a selective manner by means of a conventional gear shift lever "H" mounted on the steering column just below the steering wheel 36. To accomplish this, the outer end of the shaft 29 has secured thereto an arm 37 and the outer end of the shaft 30 has secured thereto an arm 38. The arm 37 is *operably* connected by a link 39 to a gear shifting arm 40 (Figure 7), pivotally carried on the lower end of a control shaft 41 mounted in parallel relation to the steering column 42 for both limited rotary and sliding movement. Similarly the arm 38 is *operably* connected by a rod 43 to a gear shifting arm 44 pivotally carried on the shaft 41 just above the arm 40. The upper end of the shaft 41 has secured to it the gear shifting lever H (Figure 6), with which is associated a pointer 45 for cooperation with an indicia plate 46. This indicia plate is provided with an H slot with which the pointer cooperates to indicate the various [speed] *gear* ratios of the gearing as determined by the settings of the gear shifting lever. The ends of the various legs of the slot are indicated by the indicia "R," "1," "2" and "3" and the cross-over slot is indicated by the indicia "N," thus giving the operator visual knowledge of the condition of the gearing.

In order for the lever H to be selectively connected to control the two shifting arms 40 and 44 and through them the shiftable elements of the gearing, the control shaft 41 carries a pin 47 which is positioned between the *confronting* hubs of the two arms and arranged to be received in either the slot 48 in the hub of the arm 40, or the slot 49 in the hub of the arm 44. A spring 50 at the lower end of the shaft 41 is arranged to act on the shaft, with the bearing bracket 51 for the shaft 41 as a backing, to normally bias this shaft downwardly so that the pin 47 will enter the slot 48 whenever the gear shifting lever is set in its neutral position. Under such conditions the pointer will be aligned with the crossover slot in the indicia plate and free to move into either the end of the leg marked 2 or the end of the leg marked 3. When the handle H is swung so that the pointer moves to the ends of the legs of these slots, second and high [speed] *gear* ratios are obtained, due to proper rotation of the shifting arm 44 and the structure *operably* connected [therewith] *thereto*, including the shifting fork 32 and the double clutch element 27. If the gear shifting lever H should be pulled upwardly towards the steering wheel when the gearing is in neutral, then the shaft 41 will be *disconnected from arm 40 and* connected to the shifting arm 44 by pin 47 entering slot 49 and a rotation of the shaft will bring about establishment of the low and reverse [speed] *gear* ratios, depending, of course, upon which direction the shaft 41 is rotated from the neutral position.

As previously mentioned, the engine E of the vehicle has a carburetor R which is controlled by an accelerator mechanism including a pedal P in the operator's compartment. Referring to Figures 1, 8, 11, 12 and 13, the accelerator mechanism will now be described. As shown in Figure 1 the carburetor R is associated with the intake-manifold 52 of the engine. The carburetor has a throttle valve 53 of the butterfly type (Figures 1, 8 and 12) which is controlled from the exterior of the carburetor by an arm 54 connected to the buterfly pivot shaft 55. A rod 56 extends forwardly from this arm and *operably* connects it to the free end of an arm 57 pivoted on a bracket "BR" associated with the carburetor and to be later referred to. At a point intermediate the free end of the arm 57 and its pivotal end, there is connected a rod 58 which leads rearwardly and is *operably* connected to an arm 59 of a four-armed bell-crank lever 60 pivoted on the rear *side* portion of the engine by a pin 61. Connected to another arm 62 of this bell-crank lever is a rod 63 which extends through the floor board 64 of the operator's compartment and has a connection with the upper end of the accelerator pedal P, which pedal is hinged at its lower end to the floor board. A spring 65 is connected from the arm 54 of the butterfly valve to the engine so as to normally bias the butterfly valve to its closed *engine* idling position.

This accelerator mechanism, just described, is employed as part of my improved power transmitting control mechanism and in order to accomplish desired results, as will become apparent later, it is desirable that the accelerator pedal have limited free idle travel from a position wherein the pedal P is fully released and before a point is reached wherein the butterfly valve is initially opened from its engine idling position. To accomplish this there is provided in the linkage between the pedal and the butterfly valve a lost-moton connection. Preferably this connection is provided in the connection between the rod 56 and the upper free end of the pivoted arm 57. The arm 57 is provided at its upper end with a slot 66 into which the bent end 67 of the rod 56 is positioned. In order that the idling travel, [permitted] *accommodated* by slot 66, will be available when pedal P assumes its fully released position, a second spring 68 is connected between the arm 59 of the bell-crank lever and the engine. This spring normally acts to bias the arm 57 forwardly so that the bent end 67 of the rod 56 will be at the rear end of slot 66. Thus it is seen that the pedal P can move from the full line position, shown in Figure 1, to the first dotted line position, also shown in Figure 1, without acting to move the butterfly valve of the carburetor and cause speeding up of the engine.

Figure 8:
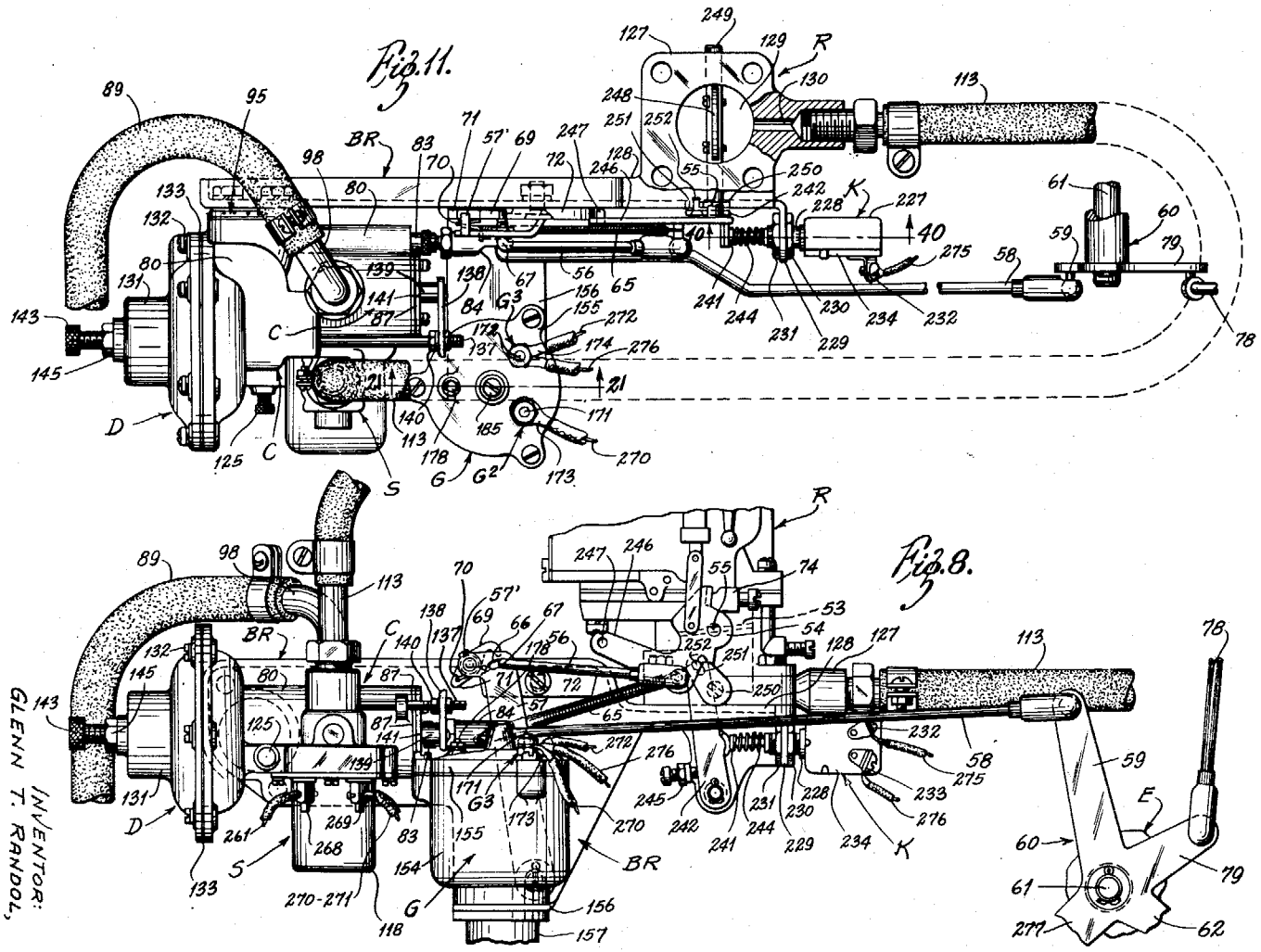
Figure 8 is an enlarged side view of my improved clutch control mechanism and associated structure, with the parts in the positions shown in Figure 1.

In order that there will be a positive connection between the arm 57 and the rod 56 after the lost-motion provided by the slot 66 has been taken up [and thus] *to* insure that all movements of the pedal and butterfly valve will be in unison *thereafter*, regardless of any friction in the parts, the upper end of the arm 57 has pivotally mounted thereon a hook 69 arranged to hook over the turned end of the rod 56 and positively hold the said rod end at the forward end of the lost-motion slot 66. A torsion spring 70 biases this hook to its unhooked position as shown in Figures 1 and 8. The hook is provided with a tail 71 which is arranged to cooperate with a cam plate 72 fastened to the bracket BR, on which the arm 57 is also pivoted. The cam has a cam surface 73 so positioned with relation to the tail that when the accelerator pedal is depressed sufficiently to take up the lost-motion provided by slot 66, the tail will engage the cam surface 73 and so pivot the hook that it will engage the turned end 67 of the rod. As the arm 57 continues to move, as a result of continued movement of the accelerator pedal, the tail continues to cooperate with the cam surface so that the hook will remain engaged throughout [any] *the full* operation *of the operating cycle* of the butterfly valve. When the accelerator pedal is released to a point [where] *wherein* the tail no longer engages with the cam plate, the spring 70 will release the hook from the turned end of the rod and [permit] *thus enable* the lost-motion provided by the slot 66 to be re-established.

In order that the idling position of the butterfly valve may be definitely determined, the carburetor has an adjustable stop 74 which cooperates with the arm 54 on the outer end of the pivot shaft 55 of the butterfly valve. Also, in order that the pedal P may have a stop for its full released position to which it can be returned by the spring 68, there is provided a stop 75 (Figure 1) which is associated with a control means for an accelerator control switch A mounted on the [dash board] *firewall* 76 of the vehicle and to be later described. This stop 75 is carried by the box of the accelerator controlled switch "A" and is engaged by the arm 77 which controls the switch. The arm 77 is connected by a rod 78 to an arm 79 of the bell-crank lever 60, forming part of the linkage between the accelerator pedal and the throttle [value] *valve*.

The control mechanism which is to be under the control of the accelerator mechanism and is employed to control the disengaging and re-engaging of the friction clutch CL and also to cause certain gear ratio changing, comprises as its essential devices a clutch-controlling valve means "C," a centrifugal governor "G," a limit switch "L," an accelerator switch "A" and a "kick-down" switch K. Associated with the valve means C is a diaphragm servomotor "D" and a solenoid-controlled valve "S." The various switches referred to and the solenoid for the solenoid controlled valve S are all embodied in control circuits which are associated with the ignition switch "I" for the engine and draw their electric current from the battery "B" until the generator (not shown) is cut in a predetermined vehicle speed. These various devices referred to by letters are all shown in Figure 1 and most of them are also shown in the wiring diaphragm of Figure 48. In addition to this, the actual structure of the devices is disclosed in detail in Figures 8 to 47 and details thereof will now be described, together with the electrical circuits involved.

Referring first to Figures 8 to 20, the control valve means C, together with the vacuum-controlled diaphragm motor D and the solenoid controlled valve S, will be described, as will also their relationship to certain other structure. The control valve means C, which includes what is to be called the combined follow-up valve and dampening valve, has a casing 80 mounted on the bracket BR, already referred to in connection with the accelerator mechanism previously described. This casing is provided with two parallel bores 81 and 82. [Slideable] *Slidable* within bore 81 is a rod 83, the rear end of which extends out of the casing and is connected to the arm 57 by an adjustable coupling 84, said connection being made to the lever at the point [where] *wherein* the accelerator rod 58 is connected. The forward end of the rod 83 is pivoted to the free end of an arm 85 which is pivoted in an enlarged chambered portion of the casing as best shown in Figure 15. The connection between the rod 83 and the arm 85 comprises a pin and slot arrangement 86 which enables the arm to be swung on its pivot as the rod 83 is reciprocated in the bore 81 by actuation of the accelerator mechanism.

The bore 82 is provided with a sleeve 87 which is press fitted into the bore. Slidable within this sleeve is a spool valve element 88 extending from the forward end of the bore 82 and [being] *operably* connected to the intermediate portion of the arm 85 by a pin and slot connection 89 so as to be movable by said arm. The spool valve 88 comprises one element of a follow-up valve and the other element of this follow-up valve comprises a sleeve valve element 90 in the shape of a cup, slidable in the rear end of the sleeve 82 already referred to. The spool valve element is provided with a fairly wide annular groove 91 at its inner end and a narrower annular groove 92 spaced therefrom towards the outer end of the valve element. The groove 91 is employed during disengaging of the clutch by release of the accelerator pedal and during re-engagement of the clutch. The groove 92 is employed only during a "kick-down" shifting operation, as will later be apparent. The inner end of the valve element is reduced in diameter so that it can be telescopically associated with the sleeve valve element 90, all as best shown in Figures 15, 18, 19 and 20. The spool valve element also is provided with an axial passage 93 so that the inner portion of the sleeve valve 90 can be placed in communication at all times with the chamber 94 of the valve casing in which the previously referred to arm 85 is positioned, which chamber is always in constant communication with the atmosphere through an air filter 95. With this arrangement the inner portion of the sleeve valve will always be subject to atmospheric pressure which prevents air being trapped between the valve elements.

The annular groove 91 is arranged to be continuously in communication with the fluid motor M during a predetermined movement of the spool valve element 88 for operating the clutch and for accomplishing this, the sleeve 87 is provided with a slot 96 associated with a port 97 in the casing to which is connected a conduit 98 leading to the fluid motor M. In order to insure that this slot 96 will not be closed by the larger diameter of the spool valve element during approximately two-thirds of its stroke, the said valve is formed with a land 99, as best shown in Figures 16 and 17. The annular groove 91 is also arranged to be in constant communication in a like manner with the diaphragm motor D associated with the valve means C, and to accomplish this, the sleeve 87 is provided with a slot 100 which is opposite the end of a drill passage 101 in the valve casing. This drill passage 101 leads forward to the diaphragm motor D. In order that the slot 100 will not be covered up by any actuation of the spool valve element during approximately two-thirds of its stroke, said spool valve element has a second land 102. The bore 82 which receives the pressed in sleeve 87 is enlarged to form with the sleeve 87 an annular chamber 103, and in order that air may enter this chamber from the interior of the sleeve 87, and also the interior of the sleeve valve element 90, the sleeve 87 is provided with opposed slots 104 and 105. These slots are controlled by the sleeve valve element 90 and such sleeve valve element is provided with cooperating slots 106 and 107, said slots being shorter in axial length than the slots 104 and 105. Slots 106 and 107 in the sleeve valve element are also so associated with the annular rib 108 on the inner end of the spool valve element so as to provide the follow-up valve. When the sleeve valve element 90 and the spool valve element 88 function as a follow-up valve, air will be able to pass from the annular chamber 103 through the slots 104 and 105 in fixed sleeve 87, [then] *thence* through the slots 106 and 107 in the sleeve valve element 90 and from there into the annular groove 91 in the spool valve element which, as already indicated, is in constant communication with the diaphragm fluid motor D and the clutch control motor M.

The annular groove 91 in the spool valve element is also arranged to be connected with the source of fluid pressure different from atmosphere, which in this instance will be, for example, the intake manifold of the engine. This connection is to be available only when the accelerator pedal is fully released. To accomplish this the fixed sleeve 87 is provided with a slot 109 which communicates with a passage 110 in the casing 80 leading to a small chamber 111 formed in an extending portion of the valve casing 80. The slot 109 is so positioned with respect to the spool valve element that it will be closed off by said element when the accelerator pedal is depressed from released position. The closing off is accomplished before the carburetor butterfly valve is opened due to the *limited* lost-motion in the accelerator mechanism already described. The chamber 11 is connected through a port 112 to a conduit 113 which leads to the intake manifold of the engine. A disk check valve 112′ is associated with port 112 which will be unseated by suction. The port 112 is arranged to be controlled by the solenoid-[control] *controlled* valve S and is thus provided with a seat 114 for cooperation with a movable disc type valve element 115 mounted on the end of a solenoid armature 116. The solenoid armature is slidable within the solenoid windings 117 contained in a cup-shaped cover 118. A spring 119 normally biases the armature so that valve element 115 will be seated on seat 114.

In order to provide an atmospheric inlet to the chamber 117 it has associated therewith a plate 120 having a port 121 provided with a seat 122 which is opposed to the seat 114 and arranged to be engaged by the valve element 115. The *spaced* arrangement of the seats 114 and 122, together with the valve element 115, is such that when the solenoid is energized the valve 115 will be unseated from the seat 114 and seated on the seat 122 to thus close off the port 121. When the solenoid is de-energized reverse operation will take place. The port 122 is arranged to be in constant communication with the atmosphere by the provision of a drilled passage 123 coming from the chamber 94 and entering a chamber 124 formed below the plate 120. The drilled passage is arranged to have its cross sectional area varied by a needle valve 125. The chamber 124 is connected to admit air to the annular chamber 103 surrounding the fixed sleeve 87 and this is accomplished by means of a drilled passage 126.

The intake manifold connection to the conduit 113 is accomplished by means of a spacer plate 127 (see Figure 11) which is mounted beneath the carburetor mounting flange. Interposed between the spacer plate and the [bolt of] *opening into* the manifold is the attaching flange 128 of the bracket BR (see Figure 8). Suitable cap bolts connect the carburetor, the spacer plate, the bracket flange 128 and the manifold together in proper aligned relation. The spacer plate has an opening 129 in correct alignment with the bore in the carburetor leading to the intake manifold. A similar opening is in the bracket attaching flange. A drilled passageway 130 connects the conduit 113 with the opening 129.

The sleeve valve element 90 is arranged to be under the control of the diaphragm motor D and when so controlled it functions both as an element of the follow-up valve structure and as a dampening valve. Its function as a follow-up valve is in cooperation with the spool valve element 88 and its function as a dampening valve is in cooperation with the slots 104 and 105 in fixed sleeve 87.

Again referring to Figures 15, 18, 19 and 20, the diaphragm motor D is associated with the portion of the casing 80 which contains the atmospheric chamber 94 in which the arm 85 is pivoted. The motor has a cup-shaped casing element 131 which is bolted to the casing 80 by means of bolts 132. The diaphragm 133 for the motor has its peripheral portion clamped between the casing element 131 and the casing 80. The diaphragm with the casing element 131 provides a chamber 134 to which the previously referred to drilled passage 101 is connected, a portion of said passage extending through casing element 131. The diaphragm has *operatively* connected thereto a rod 135 which extends across the chamber 94 and has slidable bearing in a bore 136. This rod has connected to it a second rod 137, which extends out of the casing 80 for controlling the sleeve valve element 90. The connection between the rod 137 and the sleeve valve comprises an arm 138 carried on the outer end of the rod and secured to a short rod 139 attached to the sleeve valve element 90. In order that adjustment may be provided between the sleeve valve element and the diaphragm, the arm 138 is connected to the rod 137 by an adjustable means 140. A closure plate 141 is provided for the flanged end of fixed sleeve 87 and this plate acts as a stop means for the valve element 90 in its normal inoperative position. A coil spring 142 acts on the diaphragm to normally bias it so that the valve element 90 will be in its normal inoperative condition, this condition being shown in Figure 15. The spring 142 is arranged to have its tension adjusted by an adjusting screw 143 which acts on a cup-shaped washer 144 against which the spring 142 abuts. A lock nut 145 insures that the screw will be locked in any adjusted position.

When the diaphragm motor D is connected to the sleeve valve element 90 in the manner shown it is seen that if the diaphragm motor D is caused to operate by placing it in communication with the engine intake manifold, the diaphragm 133 will be moved to the left from the position shown in Figure 15 and assume the position shown in Figure 18. This will result in a movement of the sleeve valve element 90 from the position shown in Figure 15 to the position shown in Figure 18, [where] *wherein* it is ready to function as an element of the follow-up valve means by cooperation with the spool valve element forming the other element of the follow-up valve, and also function as the dampening valve element independently of the condition of the spool valve element, which is controlled by the accelerator pedal. It is to be noted that a common connection of the diaphragm motor D and the clutch controlling motor M to the intake manifold is provided by conduit 113 whenever drilled passages 100—101 are placed in communication with the annular groove 91. Because of this common communication, it is apparent that the fluid pressure effective in the diaphragm motor D will always be the same as in the suction motor M.

Figure 2:
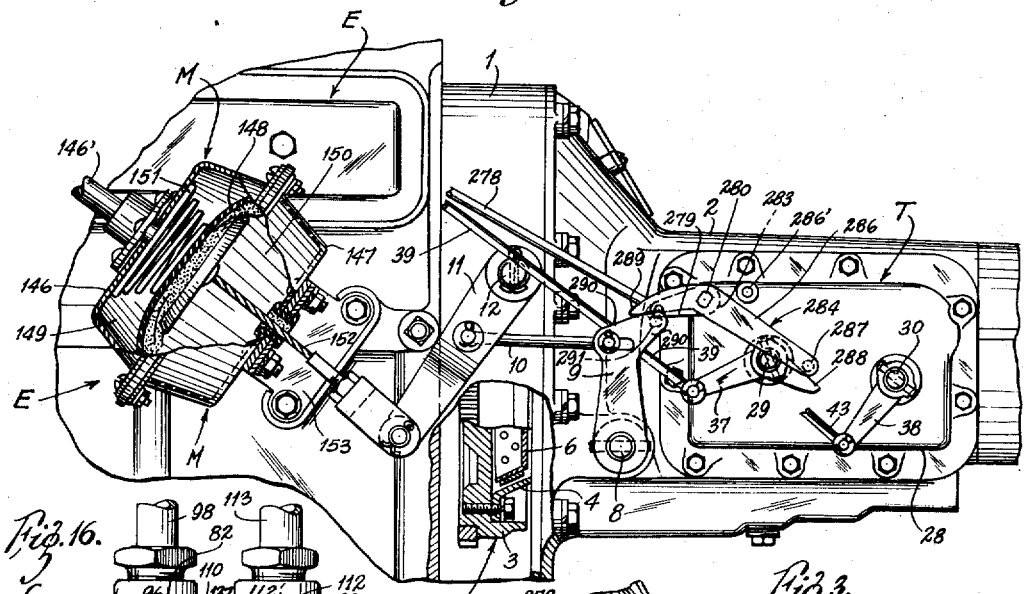
Figure 2 is a side view of a part of the structure shown in Figure 1, showing the clutch fully disengaged and the gearing in second speed drive.

The suction operated motor M employed to control the friction clutch CL of the vehicle, is also of the diaphragm type and is best illustrated in Figures 1 and 2. The motor is constructed from two cup-shaped members 146 and 147. Between these two members is clamped the diaphragm 148 of the motor to thus provide a suction chamber 149 and an atmospheric chamber 150. A spring 151 normally biases the diaphragm into the atmospheric chamber 150 as shown in Figure 1. The suction chamber 149 is connected by a short tube 146′ to the previously referred to conduit 89 coming from the valve control means C. A cable 152 connects the diaphragm with the previously mentioned arm 11 which controls the [main] friction clutch CL. The suction motor is mounted on the side of the engine by a suitable bracket 153. When atmospheric pressure is present in both chambers 149 and 150 the friction clutch CL will be [allowed to be] engaged under the action of its engaging spring, together with the spring 151 acting on the diaphragm, all as shown in Figure 1. When the chamber 149 is connected to the intake manifold of the engine through the control valve means C, differential pressures will be effective in the chambers 149 and 150, thus causing the suction motor to be operated and the diaphragm moved to the position shown in Figure 2 wherein the friction clutch CL will be disengaged.

The governor control switch means G, forming one of the devices of the control means, will now be described, and in connection therewith reference is made to Figures 21 to 24. The governor switch means is of the two-stage type and is so arranged that one switch, which will be referred to as $G^2$, will be closed when the speed of the vehicle is substantially 5 to 7 miles per hour, and a second switch referred to as $G^3$ will be closed when the speed of the vehicle is at or above approximately 7 miles per hour. The governor has a cup-shaped case 154 provided with a cover 155 of suitable non-conducting material. The governor is attached to the same bracket BR that the control valve means C is attached, this attachment being accomplished by providing a holed flange 156 on the bracket BR through which is an extending threaded part on the lower portion of the casing. This extending end is clamped to the bracket flange by a nut 157. Journaled in the casing is a shaft 158 which is driven, *for example*, by means of a flexible shaft 159 from the propeller shaft 22 of the vehicle. To drive the shaft 159 the propeller shaft is provided with a worm gear 160 which meshes with a gear 161 on a shaft 162 to which the shaft 159 is connected. The geared driving connection can be the same as employed to drive the flexible shaft 163 which controls the speedometer of the vehicle.

The shaft 158 of the governor is provided with a plate 164 on which is pivoted two centrifuge members 165 and 166 to provide a fly-ball type of governor. These two centrifuge members engage a sleeve 167 slidably mounted on a pin 168 extending from the shaft 158. The pin 168 is square, as is the bore of sleeve 167, so that the sleeve will rotate with shaft 158. The connection between the sleeve 167 and the centrifuge members is such that the sleeve will be moved upwardly whenever the centrifuge members fly outwardly, due to increasing speed of the shaft 158 which, of course, would be caused by increasing speed of the vehicle. Sleeve 167 has a short portion 169 extending upwardly therefrom and integral with this short portion is an eccentric cam member 170 for controlling the two switches $G^2$ and $G^3$ of the governor.

The cover carries the fixed contact element 171 of the switch $G^2$ and the fixed contact element 172 of the switch $G^3$. These contact elements have terminals 173 and 174, respectively. The cover of the governor also has pivoted thereon an arm 175 which forms the movable member by which the movable contact elements 176 of switch $G^2$ and 177 of switch $G^3$ are controlled. This arm is arranged to swing in a plane at right angles to the axis of the governor. Its pivot pin 178 is at one end of the arm and the other end of the arm lies between the fixed contacts 171 and 172 and carries the contacts 176 and 177. The arm 175 is arranged to be of the snap-over type and to accomplish this there is provided an over-center spring 179 connected at one end to an intermediate portion of the arm and at the other end to the casing and extending across the axis of the pivot pin 178 for the arm. The spring arrangement is such that it will be effective to perform the final closing movement of the contacts comprising switch $G^2$ with a "snap" action and hold them closed, or to complete the closing of contacts comprising switch $G^3$ and, once such contacts are closed, to hold them closed until another change-over is made.

The moving of the arm 175 to the two switch closing positions is accomplished by means of the previously referred to eccentric cam 170 and over-center spring 179. To accomplish this the bottom of the arm carries a downwardly extending pin 180 on one side of the axis of the governor and on the opposite side a flange portion 181, from which extends upwardly a second pin 182. The ends of the pins 180 and 182 are so axially spaced from each other that it is impossible for the eccentric cam to engage both pins simultaneously. Also the diameter of the cam 170 is slightly less than the distance between the sides of the pins contacted by the cam so that when either of the switches $G^2$ or $G^3$ is closed the associated pin will be out of the rotative path of the eccentric cam 170.

When the vehicle is stopped, or being driven below approximately 7 miles per hour, the cam 170 will be in a position to engage pin 182 and consequently the arm 175 will be swung over-center so that the spring 179 can close the contacts of switch $G^2$ with a "snap" action, in which position the contacts will be held by the spring 179. Once these contacts are caused to be closed the pin 182 will be so positioned that it will no longer be able to be contacted by the cam 170 as it rotates with the governor shaft 158. As the speed of the vehicle increases above 7 miles per hour, the cam 170 will be moved upwardly by the centrifuge member to a point above the upper end of the pin 182 and will then be in a position to engage the lower end of pin 180. When this occurs the eccentric cam will swing the arm 175 so as to cause a breaking of the contacts of the switch $G^2$ and as the arm 175 moves over-center the spring 179 will complete the closing of the contacts of switch $G^3$ with a "snap" action and maintain them closed until switch $G^2$ is again closed. When the switch $G^3$ is closed the pin 180 will be positioned sufficiently away from the eccentric cam that it cannot hit this pin as said cam continues to rotate. If the speed of the vehicle should drop below 7 miles per hour, the cam will again cooperate with the pin 182 and open the contacts of switch $G^3$ and cause the closing of the contacts of switch $G^2$ by the action of the over-center spring 179. The construction of this two-stage governor switch means insures a smooth and quick switch change-over action, since the centrifuge members need only operate the sleeve 167. The movement of the switch controlling arm requires none of the centrifugal force employed for *selectively* moving the sleeve 167 axially as the switch moving force comes from the rotation of the sleeve. As a result, considerable or all "hunting" is eliminated, and also the contact elements can be made sufficiently large to carry heavy current loads without the necessity of using relay switches in the electrical control circuits, particularly sustained energized control circuits.

The centrifuge members are arranged to act against a spring means, preferably carried by the cover 155, and to accomplish this the pin 169 so extends through a slot in the arm 175 that it can be engaged by a cover carried plunger 183, which plunger is acted upon by a spring 184, the tension of which may be adjusted by a screw-plug 185. The movable contacts 176 and 177 are arranged to be grounded and this is accomplished by copper strip 186 (Figure 21) which connects the pivot pin 178 of the arm to the governor casing. The circuit connections of the fixed contacts of the switches $G^2$ and $G^3$ will be later referred to when the wiring diagram is described.

Another device of the control means is the limit switch means L, the details of which are disclosed in Figures 26 to 34. This limit switch means comprises two switches $L^2$ and $L^3$ enclosed within a switch box 187, and is mounted on the lower portion of the steering column above the shifting arms 40 and 44 and is bolted to an extension 188 of the bracket 51, which extension 188 overlies the portion of the shifting control shaft 41 which carries the shifting arms. The limit switch means is to be controlled solely by the second and high speed shifting arm 40 and to accomplish this the switch box has journaled therein a cam shaft 189 on the outer end of which is secured an arm 190. In order to actuate this arm by the gear shifting arm 40 a link 191 connects the arm 190 with a short extending arm 192 which extends from the hub of the arm 40 on the side of the shaft opposite that from which the arm 40 extends.

Within the switch box are the two limit switches $L^2$ and $L^3$ and these switches are carried by the cover plate 193 which is made of non-conducting material. The fixed contact 194 of the switch $L^2$ is carried on a bracket 195 attached to the inside of the cover plate by a terminal 196. The movable contact 197 of the switch $L^2$ is carried on an arm 198 which is pivoted to a bracket 199 attached to the inside of the cover plate by a terminal 200. The arm is biased by a spring 201 so that the contacts can be closed. The free end of the arm 198 carries an extension 202 of non-conducting material which overlies the cam shaft 189 so that said shaft can open the switch contacts. To accomplish this the cam shaft 189 has an actuating cam 203 so formed that only a rotation of the cam shaft is a counter-clockwise direction, as viewed in Figure 32, will open the contacts of the switch.

Construction of the switch $L^3$ is substantially the same as that of $L^2$. The fixed contact 204 of this switch is carried on a bracket 205 attached to the inside of the cover plate by a terminal 206. The movable contact 207 of the switch $L^3$ is carried on an arm 208 pivoted to a bracket 209 which is secured to the inside of the cover plate by a terminal 210. A spring 211 normally biases the arm so that the contacts can be closed. The free end of the arm 208 carries an extension 212 of non-conducting material for cooperation with an actuating cam 213 on the cam shaft 189. The cam 213 is so arranged that it can open the switch only when the cam shaft is turned in a clockwise direction as viewed in Figure 33.

Both cams 203 and 213 have a predetermined relationship with each other, as can be seen best in Figure 34, and with the switches $L^2$ and $L^3$. This relationship is such that both switches $L^2$ and $L^3$ will be closed by their springs 201 and 211, respectively, when the cam shaft 189 assumes a position corresponding to that of the neutral position of the second and high speed shifting arm 40. Whenever the shifting arm 40 is rotated to obtain second speed ratio, the switch cam shaft 189 will be rotated in a counter-clockwise direction, as viewed in Figure 28, and consequently the cam 203 will open the switch $L^2$, but will not open the switch $L^3$. The open condition of the switch $L^2$ is shown in Figure 32. When the gear shifting arm 40 is moved so that high speed ratio is established, the switch cam shaft will be so rotated in a clockwise direction, as viewed in Figure 28, so as to cause the limit switch $L^3$ only to be open, as is the condition shown in Figure 33. The circuit connections of the two limit switches and the manner in which they function in the control means will be later referred to when the wiring diagram shown in Figure 48 is described.

Another switch forming a part of the control is the accelerator control switch A which is shown. in detail in Figures 35 to 39, inclusive. This switch is enclosed in a box 214 which is attached to the vehicle [dashboard] *firewall* by bolts 215. The box is provided with a cover 216 of non-conducting material. The construction of this switch is similar to the limit switches $L^2$ and $L^3$, just described, with both movable and fixed contacts being carried by the cover. The fixed contact 217 is carried on a bracket 218 secured to the inside of the cover plate 216 by a terminal 219. The movable contact 220 is carried on an arm 221 which is pivoted to a bracket 222 secured to the inside of the cover by a terminal 223. A spring 224 normally biases the contacts toward closing position. The arm of the switch is arranged to be opened by a cam shaft 225 journaled in the switch box. This shaft is provided with a cam 226 for cooperation with an extension 227 of non-conducting material carried on the free end of the arm 221. The switch cam shaft 225 carries on its outer end the previously referred to arm 77 which was described in connection with the accelerator mechanism, particularly with respect to the stop 75 for determining the fully released position of the accelerator mechanism, said stop 75 being carried on the outside of the switch box and engageable by the arm 77. The connection between the arm 77 and the accelerator mechanism is such that when the accelerator pedal P is in its fully released position the cam shaft 225, together with the carried cam, will be so positioned that the contacts of the switch A will be closed, as shown in Figure 36. When the accelerator pedal is depressed sufficiently from its fully released position, as shown in full lines in Figure 1, to rotate the cam shaft approximately 10 degrees, the cam 226 will swing the arm 221 so that the contacts of the switch will be opened, as seen in Figure 39 [where] *wherein* they will remain open for all further operative positions of the accelerator mechanism. The manner in which the accelerator switch A is connected in the control circuit will be described in connection with the wiring diagram shown in Figure 48.

Another switch in the control circuit for the control means comprises the "kick-down" switch K which is arranged to be closed only when the accelerator mechanism is fully depressed within limits at substantially the end of its [normal] *engine* operating range, that is, substantially to the floor board. The detailed structure of the "kick-down" switch is shown in Figures 40 to 43. The "kick-down" switch comprises a box 227 which carries a threaded attaching sleeve 228 whereby the switch can be attached to a flange 229 of the bracket BR by means of clamping nuts 230 and 231. The mounting of the "kick-down" switch is closely adjacent the carburetor, as can best be seen in Figure 1. The switch box carries two terminals 232 and 233, the terminal 232 being best shown in Figure 1, whereas the terminal 233 is shown in the sectional view in Figure 40. These terminals are also indicated by dotted circles in Figure 41. The terminals are carried by the non-conducting cover plate 234 and beneath this cover plate is a shim plate, also of non-conducting material 235, through which the terminals extend so that they can be bridged by a conducting element to close the circuit. This bridge member 236 of conducting material is carried by a movable member 237 slidable in the box 227. The bridge is attached to a non-conducting plate 238 interlocked with the member 237 and spring biased outwardly by a spring 239 in such a manner that the bridge member 236 will have spring pressure against the plate 235. When the member 237 is moved to the right, as viewed in Figure 40, it can assume a position [where] *wherein* the bridge 236 will engage both terminals 232 and 233, thus closing the circuit. In other positions of the slidable member 237 the circuit will be broken. Since this "kick-down" switch K is to be closed only when the accelerator pedal is fully depressed, it is arranged *in practice* to be moved to closed position just as the accelerator pedal reaches substantially the floor boards. An actuating rod 240 extends through the thread attaching sleeve 228 and is formed with a head 241 for engagement by an arm 242 pivoted on a pin 243 (Figure 8) to the bracket BR. A spring 244 is interposed between the head and the attaching sleeve to normally bias the rod and the member 237 to a position [where] *wherein* the switch A is open. An adjusting means 245 comprising an adjusting screw is associated with the bracket BR and the arm 24 (Figure 8) so that the position of the arm can be adjusted in its "off" position so as to engage the head 241.

The control of the "kick-down" switch by means of the accelerator mechanism is best shown in Figures 8, 12 and 13. The arm 54 which is carried on the end of the butterfly valve shaft 55 of the carburetor is provided with an extension 246 and on the end of this arm is a pin 247. This arm is so related to the arm 242 for controlling the "kick-down" switch that the pin 247 on arm 246 will engage the arm 242 only when the accelerator mechanism is moved substantially to fully open throttle position. The arm 246, as the accelerator is depressed, swings downwardly and the pin 247 simultaneously engages the arm 242 to swing this arm in a clockwise direction to the switch closing position, as shown in Figure 13.

Since the "kick-down" switch K is employed in making a shift from high to second speed *drive* ratio by depressing the accelerator pedal substantially to the floor board, it is necessary to provide some means to idle the engine during this shift *to prevent "racing"*. This is accomplished by means of an auxiliary butterfly valve 248, best shown in Figure 11. This butterfly valve is carried on a shaft 249 extending across the opening 129 in the previously referred to spacer plate 127 which provides a connection between the valve means C and the intake manifold of the engine by means of a conduit 113. Secured to the outer end of the auxiliary butterfly valve shaft 249 is an arm 250 having in its free end a slot 251 into which extends a pin 252 carried by the upper end of the "kick-down" switch actuating arm 242. With this arrangement the auxiliary butterfly valve 248 can be quickly closed whenever the arm 242 is actuated to close the "kick-down"

switch K. Whenever the "kick-down" switch is open, as is shown, for example, in Figure 8, the auxiliary butterfly valve will be *wide* open. However, when the "kick-down" switch is closed by fully depressing the accelerator pedal, as shown in Figure 13, the auxiliary butterfly valve will be closed and the engine will be caused to idle, notwithstanding the fact that the main butterfly valve of the carburetor is slightly beyond wide open position. Simultaneously with the closing of the auxiliary butterfly valve the spool valve element 88 will be positioned so that groove 92 connects slots 109 and 96, as shown in Figure 20, already described.

The control circuit for my control means is connected to the usual electrical circuit of the automobile so as to be controlled by the ignition switch I mounted on the instrument panel and shown in detail in Figures 45 to 47. This ignition switch is of known construction and comprises a box 253 secured to the instrument panel by bolts 254. The box 253 has a wall 255 of non-conducting material in which are mounted three terminals 256, 257 and 258. The terminal 256 is connected by a conductor 259 to the grounded battery B of the electrical system of the vehicle which also includes the generator. The terminal 258 is connected by a conductor 260 to the coil and distributor system forming the ignition circuit of the vehicle. The terminal 257 has a conductor 261 which forms part of the control circuit embodied in my improved control means. The ignition switch is controlled by a handle 262 which is attached to swing a triangular-shaped block 263 of non-conducting material positioned in the switch box. This block carries a switch bridging plate 264 of conducting material, provided with three extruded contact buttons 265, 266 and 267. Springs 268 interposed between the block and the bridging plate normally bias the bridge plate so that the buttons can engage the terminals carried by the wall 255. The button 265 is opposite the pivotal axis of the block 263 and is at all times in contact with terminal 256 coming from the battery. When the block is swung to the position shown in full lines in Figure 47 the buttons 266 and 267 will contact, respectively, the terminals 257 and 258, thus energizing all circuits. When the block is swung to the position shown in dotted lines in Figure 47 the ignition switch will be open, as will all the circuits *leading therefrom*.

Referring now to the wiring diagram shown in Figure 48 (wherein energized circuits are depicted by solid lines and non-energized circuits by dashed lines), the electrical connections between the various switches and the solenoid of the solenoid controlled valve will be described. The conductor 261 coming from the ignition switch is connected to one terminal 268 of the coil 117 of the solenoid for controlling the solenoid valve S. The other terminal 269 of the winding 117 is connected by a conductor 270 to the terminal 173 of the governor switch G, which terminal is connected to the fixed contact of the switch $G^2$ controlled by the governor. The terminal 269 of the solenoid windings is also connected by conductor 271 to the terminal 200 of the limit switch $L^2$. The terminal 174, which leads to the fixed contact of the switch $G^3$ in the governor controlled switch, is connected by a conductor 272 to the terminal 223 of the accelerator control switch A. The other terminal 219 of this switch is connected by a conductor 273 with the terminal 206 of the limit switch $L^3$. The other terminal 210 of this limit switch $L^3$ is connected by a conductor 274 to the conductor 271 which, as already stated, is connected between the terminal 269 of the solenoid windings and the terminal 200 of the limit switch $L^2$. This latter limit switch $L^2$ has its other terminal 196 connected by a conductor 275 with the terminal 233 of the "kick-down" switch. The other terminal 232 of the "kick-down" switch is connected by a conductor 276 with the terminal 174 of the governor switch $G^3$. Since the battery B for the vehicle is grounded and also the governor switch means G, it is seen that the various circuits described can be energized when the switches associated therewith are closed. The solenoid of the solenoid controlled valve will always be closed whenever the switch $G^2$ is closed, since then a circuit will be established. As already mentioned, this condition is present whenever the vehicle is moving below a speed of 7 miles per hour. The solenoid will also be energized whenever the switch $G^3$ is closed, together with the "kick-down" switch K and the limit switch $L^2$, or whenever the switch $G^3$ is closed, together with the accelerator [control] *controlled* switch A and the limit switch $L^3$.

In connection with the operation of the "kick-down" switch which is employed to automatically disengage the clutch CL by fully depressing the accelerator pedal substantially to the floor board, there is provided means controlled by the accelerator pedal for also automatically causing a change in speed ratio from high speed ratio to second speed ratio by the suction motor M if the vehicle is *operating* in high speed ratio. The mechanism illustrated is best shown in Figures 1 to 5. The fourth arm 277 on the accelerator mechanism bell-crank lever 60 is connected by means of a link 278 to an arm 279 which is freely pivotally mounted on a shaft 280. This shaft 280 is journaled in the forward portion of the transmission housing cover plate 28 adjacent second or high speed ratio shifting shaft 29 and is capable of axial slidable movement. The shaft 280 extends through a cam member 281 fixed to the cover plate 28 by having a pressed fit in a boss 282 carried by the cover plate. Cooperating with this cam member 281 is a cam surface 283 on the arm 279. On the outer end of the shaft 280 is an L-shaped lever 284 secured to the shaft intermediate its ends. The arrangement is such that when the accelerator pedal is fully depressed *substantially* to the floor boards, the arm 279 will be given a clockwise rotation as viewed from the side of the vehicle, thus causing the cam surface 283 to cooperate with the cam member 281 and push the shaft and lever 284 outwardly away from the cover 28. This condition is shown in Figure 5. The position of the parts prior to the camming operation is shown in Figure 4. A coil torsional spring 285 is associated with the inner end of the shaft and normally tends to bias the shaft and the lever 284 to their positions shown in Figure 4. When the shaft 280 is moved axially outwardly the spring 285 will be compressed so that it will be effective to pull the shaft 280 and the lever 284 inwardly again whenever the accelerator pedal is released from its fully depressed position.

The rearwardly extending arm 286 of the lever 284 carries a pin 287 which is arranged to engage an arm 288 extending upwardly from the hub of the arm 37 which controls the gear shifting shaft 29 and fork 32, it being recalled that the arm 37 is *operably* connected with the rod 39 so as to be controlled by the gear shifting lever H.

The forwardly extending arm 289 of the lever 284 is arranged to be operated by an extending portion 290 on the clutch arm 9. The outer end of this extending portion carries a pin 291 which is of such length that it will engage the arm 289 only when the lever 284 is pushed outwardly to the position shown in Figure 5 as the result of fully depressing the accelerator pedal. Pin 291 will engage arm 289 at approximately the point that the clutch CL is disengaged to relieve the torque. When the pin 291 on the extension of the clutch arm can engage the arm 289 of the lever 284, then operation of the suction motor M to disengage the clutch will automatically cause a swinging of the lever 284 in a clockwise direction and this swinging will result in a change in speed ratio *drive* from the high speed ratio to the second speed ratio by movement of the shifting fork which controls the double clutch element 27 employed to establish second and high speed ratios, provided, of course, that the gearing is in high speed ratio. The shifting *cycle* which occurs will be described in detail later in connection with the complete operation of the "kick-down" shift.

Normal operation

Figure 6:
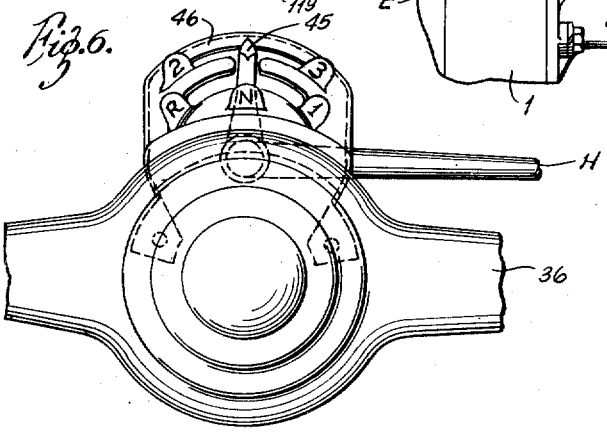
Figure 6 is a view of the steering wheel *mounted* gear shift handle and associated gear indicating bracket, as viewed by the operator of the vehicle.

In considering the operation of the improved control mechanism, it is first assumed that the vehicle is stopped, the engine is not running and the gearing is in neutral condition. When such conditions exist all the parts will be in positions shown in Figure 1. The gear shifting lever will be in the neutral position as indicated in Figure 6 and the parts of the gearing in the positions shown in Figure 4. The ignition switch will be in the "off" position and consequently the control circuit will not be connected to the battery. The friction clutch CL will be engaged as the fluid pressure motor M will be connected to the atmosphere through the control valve means C, which will be in the condition shown in Figures 1 and 8 due to the full released condition of the accelerator pedal P. The solenoid [control] *controlled* valve S will be in the position shown in Figure 16 due to the fact that the solenoid is not energized. The spool valve element and the sleeve valve element embodied in the control valve means are in the positions shown in Figure 15.

If it is desired to start the engine the ignition switch I is closed, thus connecting the ignition circuit of the engine with the battery and also the conductor 261 of the control circuit. Due to the stopped condition of the vehicle the switch $G^2$ of the governor controlled switch means G will be closed and, therefore, immediately upon closing the ignition switch the circuit, including the solenoid and switch $G^2$, will be energized. This will immediately place the solenoid controlled valve in the position shown in Figure 10, thereby closing off the port 122 and opening up the port 112 so that the chamber 111 will be in communication with the *engine* intake-manifold. When the engine is started subatmospheric pressure will be present in the manifold and consequently will also be present in the chamber 111. Since this chamber is connected by the passage 110 with the annular groove 91 of the spool valve element, both the suction motor M and the diaphragm motor D will be in communication with the intake manifold, as is illustrated in Figure 15. Consequently the suction motor M and the diaphragm motor D will be operated, which will result in the friction clutch CL being disengaged, as shown in Figure 2, and the sleeve valve element 90 moved by the diaphragm motor to the position shown in Figure 18. With the accelerator pedal released, the switch A will be in closed condition and also since the gear shifting lever is in neutral, the two limit switches $L^2$ and $L^3$ will be closed. However, the circuits involving these *two latter* switches will not be energized, due to the fact that the vehicle is stopped and the switch $G^3$ of the governor controlled switch means is open. Also, the "kick-down" switch K will be open since the accelerator pedal is released.

If it is now desired to start the vehicle in either low or reverse speed ratio, the gear shifting lever may be moved so that the pointer either indicates reverse or low speed ratio. Since the operations for driving in either reverse or low speed ratio are identical, except for gear shift lever movement, only the low speed ratio will be described in detail. With the gear shifting lever H moved to the position [where] *wherein* the pointer indicates "1," the combined low and reverse sliding gear 20 will be moved into mesh with the countershaft gear 17, thus establishing the low speed ratio drive through movement of the linkage comprising the gear shifting control shaft 41 mounted parallel to the steering column, the arm 44 and the link 43.

With the proper gears in mesh the accelerator pedal is now depressed to speed up the engine. The initial movement of the accelerator pedal from its fully released *engine idling* position, shown in full lines in Figure 1, to the first dotted line position will result in the lost-motion in the accelerator linkage mechanism being taken up and the associated hook 69 locked before any opening of the carburetor butterfly valve. During this movement of the accelerator linkage mechanism the rod 83 of the control valve means C will be moved to the right; this is, rearwardly with respect to the forward end of the vehicle. This movement of the rod also moves the spool valve element 88 rearwardly to the position shown in Figure 19. Such movement of the spool valve valve element results in the slot 109 being cut off, thus disconnecting both the suction motor M and the diaphragm motor D from the intake manifold. Also such valve element movement places the annular rib 108 at the rear end of the spool valve element in a position [where] *wherein* the slots 106 and 107 in the sleeve valve element 90 have been placed in limited communication with the annular groove 91 of the spool valve element. This will result in some air, under atmospheric pressure, entering the annular groove 91 of the spool valve element and passing to the suction motor M and the diaphragm motor D, it being noted that the slots 106 and 107 of the sleeve valve element 90 are opposite the slots 104 and 105 of the fixed sleeve 87 and these slots are in constant communication with the atmospheric chamber 103, which chamber is connected through the passage 126, the chamber 124 and the passage 123 to the chamber 94 which is always [subject] *connected* to atmospheric pressure through the air filter. Since air is being admitted to the suction motor M and the diaphragm motor D, the differential fluid pressures simultaneously acting in direct proportion on the diaphragms of these two motors will decrease and consequently the suction motor M will begin to release the friction clutch elements toward engaged position.

Immediately following the initial admission of some air to the diaphragm motor D and the suction motor M, the continued movement of the accelerator pedal will "crack" the butterfly valve of the carburetor to admit more fuel to the engine, thus initiate increasing acceleration of the engine to move the load in starting the vehicle. The depressing of the accelerator to "crack" the butterfly valve consequently will further open up the slots 106 and 107 and admit additional air into the suction motor M and the diaphragm motor D, resulting in further release of the clutch elements towards engaged condition. As air is admitted into the suction motor M and the differential fluid pressure effective in such motor is reduced, there will be a corresponding reduction of the differential fluid pressure in the diaphragm motor D, consequently the diaphragm 133 thereof will be capable of being moved from its position shown in Figure 18 toward the right under the action of the spring 144. This will result in the sleeve valve element 90 being moved in the same direction that the spool valve element 88 is being moved by the accelerator mechanism. The movement of the sleeve valve element will tend to decrease the area of the slots 106 and 107 which are open to the annular groove 91 in the spool valve element. The result will be a finely calibrated follow-up valve action between the spool valve element 88 and the sleeve valve element 90. As the accelerator is continued to be depressed, the movement of the spool valve element will allow additional air to enter the two suction motors and as the air enters the two suction motors the diaphragm of motor D will be released, along with the diaphragm of the motor M, to cause the sleeve valve element 90 to follow-up the spool valve element. It is thus seen that the increments of movement of the accelerator pedal result in like increments of release of the clutch toward engaged condition. Because of the follow-up valve the engaging movement of the clutch can be arrested at any point by stopping the depressing of the accelerator pedal. The clutch can also be [again released] *further advanced toward fully engaged condition* at any point it is arrested in its engaging movement by [again] *further* depressing the accelerator pedal.

This condition of releasing the two vacuum operated motors M and D by the action of the follow-up valve, when the [acellerator] *accelerator* pedal is depressed, will continue until the clutch elements in the friction clutch reach a point [where] *wherein* they are just initially contacting. When such occurs the differential fluid pressure in the two suction motors will begin to drop rapidly, due to the fact that the movement of the diaphragm of the suction motor M is virtually retarded to a stand-still by the initial torque transmitting engagement of the clutch elements. Air will then enter the suction motors and the entrance of the air will be controlled solely by the sleeve valve element 90 which will then function as dampening valve means to control the rate of final engaging movements of the clutch elements to their fully operative engaged condition. It will be noted that as the diaphragm 133 of the diaphragm motor D is released, under the action of the spring 144 and the flow of air from atmosphere into the diaphragm chamber 134, the slots 106 and 107 will have their areas decreased since these slots are beginning to have their communication cut off with respect to the air slots 104 and 105 in the fixed sleeve. As the area of the slots 106 and 107 is decreased, the volume of air which can enter the suction motor M and the diaphragm motor D slowly diminishes up to the point where*in* the valve element 90 assumes its normally inoperative position, as shown in Figure 15. It will be noted that in this condition the slots 106 and 107 are virtually closed. Thus by diminishing *the volume of* [the] air which can enter the suction motor M, after the initial engaging point of the clutch elements has been reached which renders ineffective the follow-up valve control action, the diaphragm of this suction motor will be slowly released during the final engaging movements of the clutch element to full operative condition. The result will be a very smooth clutch engagement and will very closely approximate the best clutch engaging action that can be accomplished with a [manually] *pedally*-controlled clutch under the operation of expert manipulation of the conventional clutch pedal.

It is to be particularly noted that during engagement of the clutch, by depressing the accelerator pedal, that the follow-up valve comprising the spool valve element and the sleeve valve element function under the control of the depressing of the accelerator pedal up to a certain point *of its full engine controlling movement*, which is substantially the point of initial frictional contact of the clutch elements. After this point has been reached all functioning of the follow-up valve ceases and the control of the volume of air entering the suction motor M and also the diaphragm motor D is controlled solely by the movement of the sleeve valve element 90. After the follow-up valve means ceases to function, the rate of depressing of the accelerator pedal [has nothing to do with] *is not utilized in* controlling the final clutch engagement movements. The entire rate of clutch engagement is completely taken away from the control of the operator and is subject only to the control which is placed thereon by the sleeve valve element 90 functioning as a dampening valve to gradually diminish the rate of flow of air to the suction motor M and thus cause it to smoothly "ease in" the clutch elements to full operative engagement. Regardless of how fast the accelerator pedal is depressed the clutch will engage smoothly, because the operator has no control over the function of the dampening valve means which solely control the final engaging movements of the clutch elements. This smooth clutch engaging cannot be accomplished if the follow-up valve means alone is employed, as in some prior control valve means, except by expert manipulation of the accelerator pedal. In my improved control means no such expertness of manipulation is required.

In properly understanding the operation of the control means to obtain smooth clutch engagement, the design of the valve control means, the size of the diaphragms of the suction motors, the cross sectional areas of the conduits and the adjustments of all parts must be taken into consideration. The valve elements 90 and 88 must be so related to each other that the follow-up functioning will begin at the proper time in relation to opening of the carburetor butterfly valve to speed up the engine. The adjustment of the relation between the diaphragm of the motor D and the sleeve valve element 90 is such that the sleeve valve element will assume control of the rate of engagement of the clutch elements at substantially their initial contact point. The relationship between the sizes of the two diaphragms, the tension of the various springs involved and the cross sectional areas of the air passages are other factors entering into the design so that proper functioning of the valve element 90 as a dampening valve means [occurs] *may be attained.* The tension of spring 142 acting on the diaphragm of motor D is adjustable by screw 143. The volume and rate of flow of air to the valve slots is controllable by the needle valve 125. When the clutch is fully engaged and the diaphragm 133 of motor D is in normally inoperative position the slots 104—106 and 105—107 are still slightly open as shown in Figure 15.

As the friction clutch CL is engaged by depressing the accelerator pedal the vehicle will move forwardly. If the speed of the vehicle reaches a value at or above approximately 7 miles per hour, the governor G will function to open the switch $G^2$ and close the switch $G^3$. As the switch $G^2$ is opened the solenoid for the solenoid controlled valve S will be de-energized and consequently the solenoid controlled valve element conditioned, as shown in Figure 9, whereby the intake manifold is cut off from the chamber 111. This, however, will have no effect on the engaged condition of the clutch, since the intake manifold has already been cut off from the suction motor M by [actuating] *actuation of* the spool valve element by the depressing of the accelerator pedal. The circuit involving the switch $G^3$ also cannot be [energised], *energized,* due to the fact that the accelerator controlled switch A is open, a result brought about by the depressed condition of the accelerator pedal. If the speed of the vehicle is not above 7 miles per hour, the solenoid will remain energized and the intake manifold will continue to be connected to the chamber 111. However, this will have no effect in operating the clutch suction motor M, because of the fact that the spool valve element 88 has cut off slot 109, due to the depressed condition of the accelerator mechanism to keep the vehicle moving.

If it should be desired to shift into second speed ratio while driving either below or above 7 miles per hour, this can be accomplished by merely releasing the accelerator pedal and manipulating the gear shifting lever so that the pointer is moved from the "1" position to the "2" position. When the accelerator pedal is released the clutch will be automatically disengaged and the movement of the gear shifting lever will result in the low speed ratio being neutralized and the second speed ratio established by a movement of the double clutch element 27 of the gearing rearwardly so as to connect the gear 24 to the transmission driven shaft. If the speed of the vehicle is below 7 miles per hour at the time second speed ratio is desired, the solenoid controlled valve S will still be in its open position (Figure 10), due to the energized condition of the solenoid. The release of the accelerator pedal will merely place the annular groove 91 of the spool valve element in the position shown in Figure 15, thereby connecting both suction motors M and D to the intake manifold, with the result that the clutch will be disengaged and the sleeve valve element moved to the position shown in Figure 18. However, if the speed of the vehicle, at the time of shifting to second speed ratio, is above 7 miles per hour, then the solenoid will be de-energized, due to the open condition of the switch $G^2$. This solenoid, however, must be re-energized (if the clutch is to be disengaged), so that the intake manifold can communicate with the annular groove 91 in the spool valve element. This re-energizing of the solenoid will be accomplished upon release of the accelerator pedal and closing of switch A, since then the governor controlled switch $G^3$ is already closed, due to the *increased* speed of the vehicle. The [other] *limit* switch $L^2$ in the circuit will be closed, due to the fact that the gearing is still in low speed ratio, it being recalled that the limit switch $L^3$ is not open unless the gearing is placed in high speed ratio, that is, moving the gear shifting lever H to the "3" position of the pointer. Thus it is seen that regardless of the speed of the vehicle, a mere releasing of the accelerator pedal after starting out in low speed ratio, will result in automatic disengagement of the clutch so that a shift into second speed ratio can be accomplished.

After second speed ratio is established by release of the accelerator pedal and a movement of the gear shift lever, the [main] clutch *CL* is reengaged merely by depressing the accelerator pedal from its fully released position. Engagement of the clutch is accomplished in the same manner as already described in connection with starting out in low speed ratio. The control of the clutch toward re-engagement as the accelerator pedal is depressed is first under the control of the follow-up valve means and after a predetermined point is reached in the re-engaging movement of the movable clutch element, which point is substantially at the point of initial contact of the clutch elements, the control of the final engaging movements of the clutch elements will be taken over by the sleeve valve element 90 functioning solely as a dampening valve. The result will be smooth engagement, as already pointed out.

When it is desired to shift from second speed ratio into high speed ratio, the clutch will be automatically disengaged whenever the accelerator pedal is released. This is brought about by closing of the accelerator control switch A and the energizing of the solenoid. It will be remembered that the switch $G^3$ was closed since the speed of the vehicle was assumed to be above 7 miles per hour when high speed ratio was desired. With the clutch disengaged, the gear shift lever H is moved from the position [where] *wherein* the pointer indicates "2" to where the pointer indicates "3." This will result in the double clutch element 27 in the gearing housing becoming disengaged from the second speed gear 24 and engaging directly with the teeth on the driving shaft for the gearing. Consequently the transmission driving and driven shafts will be directly connected together for high speed ratio. When high speed ratio is established the limit switch $L^3$ will automatically be opened due to the fact that this switch is controlled from the second and high speed arm 40 at the lower end of the gear shifting control shaft 41. The opening of the limit switch $L^3$ will immediately break the circuit in which the switch $G^3$ and the accelerator switch A are embodied. The breaking of this circuit will de-energize the solenoid of the solenoid controlled valve, thus cutting off the intake manifold from the suction motor M and the diaphragm motor D and immediately placing these motors in communication with atmosphere through the port 122 and the passage 110, it being recalled that the slot 109 leading to the annular groove 91 is open because of the released condition of the accelerator pedal. The chamber 124.

with which the port 122 is associated, is in communication with atmosphere at all times by way of the drill passage 123, the chamber 94 and the air filter. De-energizing of the solenoid will thus immediately cause atmospheric pressure to be on opposite sides of the diaphragms of both the suction motor M and [the diaphragms of both the suction motor M and] the diaphragm motor D, with the result that the clutch is immediately re-engaged automatically without any dampening action and without necessity of depressing of the accelerator pedal, as is necessary in re-engaging the clutch after low and second speed ratios are established.

This is the desired clutch operation for efficient driving since when a shift to high speed ratio is desired, the vehicle is moving at a fairly high rate of speed and a quick engagement of the clutch causes no "jerk" on the vehicle. As soon as the gear shifting lever is placed in a position to establish high speed ratio, the accelerator can be depressed as the clutch will be substantially engaged immediately after the shift to high speed ratio is accomplished. Thus it is seen that control of my novel power-operated clutch simulates that employed when a [manually] *pedally*-operated clutch is being used and a shift is made from second to high speed ratio. After high speed ratio is established and the clutch is re-engaged, it will remain reengaged, regardless of whether the accelerator pedal is released or not and thus prevent "free-wheeling" drive, since the solenoid remains re-energized, due to the open condition of the limit switch $L^3$, thus there is no possibility of releasing the clutch when driving along the highway merely by releasing the accelerator. The only way that the clutch can be disengaged by releasing the accelerator pedal is for the vehicle to decelerate to a speed value below 7 miles per hour. When this speed is present the centrifugal governor will so function that the switch $G^3$ will become open and the switch $G^2$ closed. The closing of this latter switch will then energize the solenoid and when the accelerator pedal is fully released the clutch will automatically become disengaged for a shift into either second or low speed ratio, whichever is found desirable for the driving conditions encountered. If it is found that a lower speed ratio is not desired from high speed ratio after the vehicle speed drops below 7 miles per hour in the particular transmission mechanism shown, the operator need only depress the accelerator, which will result in re-engagement of the clutch at a smooth rate, and resumption of vehicular drive in high speed. As the vehicle picks up speed above 7 miles per hour, switch $G^2$ will be reopened and switch $G^3$ closed. The closing of switch $G^3$, however, will not re-energize the solenoid because the limit switch $L^3$ still remains open, due to the high speed ratio condition of the transmission.

Transmission kickdown operation

Many conditions are encountered in driving wherein it is not desirable to wait until the vehicular speed assumes a value substantially at or below 7 miles per hour in order to obtain a de-clutching operation so that second speed ratio or low speed ratio can be established. Such conditions, for example, are when it is desired to accelerate in going up a hill or to accelerate [in going around] *to pass* a slower moving vehicle on the highway. To obtain second speed ratio under *such* conditions, the operator of the vehicle need only fully depress the accelerator pedal. When this is done the friction clutch will be disengaged by the function of the control mechanism. The fuel to the engine will be cut off so that it will drop to idling speed and a shift from high speed ratio to second speed ratio will be made. These operations are all performed automatically. When the accelerator pedal is fully depressed, the spool valve element 88 will be moved to the position shown in Figure 20. This will cause the annular groove 92 in the spool valve element to be placed so that it will register with the passage 110 to the suction motor M. The groove 92, however, is of such axial width that it will not connect the drilled passage 101, leading to the diaphragm motor D, with the source of suction, it being noted that the opening to the drilled passage 101 enters the fixed sleeve 87 at a point spaced slightly in an axial direction from the port 97 which is connected to the conduit 98 leading to the suction motor M. Simultaneously with the placing of the groove 92 in communication with the slot 109, there will be an operation of the auxiliary butterfly valve 248 to its closed position, substantially at wide-open throttle position, by structure already described. The "kick-down" switch K will also be closed, but this occurs during the final movement of the spool valve and auxiliary valve operations as previously described. The closing of the "kick-down" switch will result in energizing the solenoid, and upon such energization, the solenoid controlled valve S will be opened so that the suction from the intake manifold will be effective in the suction motor M through the annular groove 92 and as a result the clutch CL will be disengaged. It will be noted, in connection with the circuit in which the "kick-down" switch K is included, that when such switch is closed the switch $G^3$ will already be closed, as will the limit switch $L^2$. This latter switch is closed because of the fact that the change-speed gearing is in high speed ratio.

Full depressing of the accelerator pedal *substantially* to the floor board not only closes the "kick-down" switch so that the solenoid is energized, together with a closing of the auxiliary butterfly valve and proper axial positioning of the spool valve element, but also functions to actuate the cam means on the gearing housing cover to move the lever 284 from the position shown in Figure 4 to the position shown in Figure 5. This movement of the lever will place the pin 291 in the path of the clutch arm 9. Consequently this pin, as the clutch is disengaged by operation of the suction motor M, will swing the lever 284 in a clockwise direction from the position shown in Figure 3 to the position shown in Figure 2. The swinging of this lever will also cause a swinging of the arm 37 and the gear shift fork 32 which controls the double clutch element 27. Consequently the double clutch element will be shifted from its position wherein high speed ratio is established to the position wherein second speed ratio is established. When second speed ratio is established by swinging arm 37, the gear shift lever H will be swung therewith from a position wherein the pointer indicates high speed ratio across the "N" slot to the position wherein the pointer indicates second ratio. As soon as second speed ratio is established the limit switch $L^2$ will be opened, since this limit switch is controlled by the arm 40 at the lower end of the gear shifting shaft 41. When the switch $L^2$ is opened, the circuit which has been closed to energize the solenoid will immediately be opened, thereby de-energizing the solenoid. The de-energization of the solenoid will immediately allow air to enter the suction motor M in the same manner as when the solenoid was de-energized as the result of the limit switch $L^3$ being opened when high speed ratio was established. The re-engagement of the clutch CL is thus brought about automatically, and with considerable rapidity, without any necessity for releasing the accelerator pedal. However, as soon as the shift to second speed ratio is made by the "kick-down" of the accelerator pedal, the pedal should be released so as to quickly open the auxiliary butterfly valve and cause the engine to speed up in order that it can transmit power to the wheels of the vehicle according to the load and driving conditions necessitating such a speed ratio change.

From the foregoing description of the "kick-down" operation it is seen that the vehicle operator can quickly change from high speed ratio to second speed ratio by the simple operation of merely depressing the accelerator pedal. In connection with the "kick-down" shifting it is be remembered that there will be a simultaneous proper positioning of the spool valve element, a closing of the auxiliary butterfly valve and an operation of the accelerator controlled cam to move the lever 284 outwardly so that it can be actuated by the suction motor M, all of which [occurs] *occur* just before the "kick-down" switch K is closed. The closing of the switch K will then energize the solenoid and cause an operation of the suction motor M. The shift to second speed ratio results immediately as there is no restriction between the intake manifold and the suction motor as groove 92 is in proper position for connecting slots 95 and 109. The three simultaneous operations accomplished prior to closing of the "kick-down" switch may occur at any point when the main carburetor throttle valve is substantially open, fully open or somewhat beyond open position.

Mechanical valve control

In the control mechanism just described the sleeve valve element 90, which is both an element of the follow-up valve means and the control element of the dampening valve means, is controlled by the diaphragm motor D. The diaphragm motor is energized in direct proportion to the energization of suction motor M so that the diaphragms of both motors will be released simultaneously and have proportionate movement. The function of the diaphragm motor D can also be accomplished mechanically by a [direct] *linkage* connection with the suction motor M. In Figures 49, 50 and 51 there is disclosed, by way of example, a mechanical connection whereby this result can be obtained. As shown in Figure 49 the diaphragm of the motor D is eliminated and the casing element 131 is replaced by a somewhat similar casing element 131' which has no drilled passage-way in order that the passage 101 will be closed. The diaphragm connecting rod 135 is replaced by a rod 135' which is arranged to extend completely through the casing element 131' to the exterior thereof. The spring 142 is associated with the rod 135' in the same manner that it was associated with the diaphragm and rod 135 in the diaphragm motor D. On the outer end of the rod 135 is mounted a shouldered sleeve 292 which is adjustable on the rod *as* by a nut 293. The casing element 131' has an extending arm 294 upon which is pivoted a lever 295, one end of which is arranged to engage the shouldered sleeve 292 for pulling the rod 135' to the left, as viewed in Figure 49, and thus function in the same manner as the diaphragm motor D to move the sleeve valve element 90 to the position shown in Figure 15. Lever 295 is arranged to be actuated through the arm 11 to which the suction motor M is *operatively* connected to control the clutch CL and the connection to accomplish this comprises a rod 296 connected to a short arm 297 (see Figure 51) extending from the hub of the arm 11.

When the friction clutch CL is fully engaged the parts will be in the positions shown in Figure 49 and there will be a slight lost-motion connection between the lever 295 and the shouldered sleeve 292 which will correspond to the free travel in the clutch actuating linkage between the suction motor M and the clutch element actuated by the *operatively connected* clutch actuating fork. When the clutch CL is caused to be disengaged by operation of the suction motor M, the shaft 135' will be operated and the spring 142 compressed in a manner indicated by the full lines of Figure 51. Thus the sleeve valve element 90 will be moved to the position shown in Figure 18. When the clutch is now conditioned to engage by depressing the accelerator pedal P from its fully released *engine idling* position, the follow-up valve means, already described and comprising the sleeve valve element 90 and the spool valve element 88, will function to control the engaging movement of the clutch by the suction motor M. As the clutch moves towards engagement the arm 295 will be caused to rotate in a clockwise direction from the position shown in full lines in Figure 51 and towards the position shown in Figure 49, thus moving the sleeve valve element 90 so that it will function as an element of the follow-up valve means. When the re-engaging movement of the clutch reaches a predetermined point (substantially at point of initial frictional contact of the clutch elements), the follow-up valve means will no longer function to control the engaging movement of the clutch and this function will be taken over solely by the sleeve valve element 90 functioning as a dampening valve. As the clutch is then [allowed] *controlled* to move into full engagement, its rate *and extent* of engaging movement will be in accordance with that [allowed] *caused* by the movement of the sleeve valve element in slowly closing off the air inlet slots 104 and 105 in the fixed sleeve 87.

From the foregoing it is seen that the control of the sleeve valve element 90 by the *aforedescribed* mechanical *linkage* connection with the suction motor is identically the same as [it is] *produced* when the diaphragm motor D is employed.

The normal inoperative position of the sleeve valve element 90 will be adjusted in the same manner as is done in the control valve means described in connection with Figures 1 to 48. The adjustment of the nut 293 is merely employed to adjust the free travel of the lever 295 before it picks up the shaft 135' to operate the sleeve valve element 90 to the position shown in Figure 18.

In connection with my improved control means I have shown, by way of example, a manually-controlled gear shifting means for accomplishing all changes in speed [ratios] *gear-drives* and additional automatic "kick-down" shifting operations to change from high [speed] *gear* ratio to second speed [ratio] *gear*. This example of gear shifting is illustrated primarily for simplicity. It is understood, however, that the improved clutch control means operable by the accelerator mechanism when released, and the control means for automatically disengaging the clutch and controlling immediate re-engagement upon fully depressing the accelerator pedal, can be employed with various types of gear-changing mechanism and particularly speed ratio changing mechanism which is power-actuated.

It is to be understood that modifications and variations may be effected without departing from the *scope of the* novel concepts [and scope] of the present invention as defined in the claims appended hereto.

I claim as my invention:

1. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a power device operably connected to one of the movable elements of the clutch, *a source of power to operatively energize said power device*, control mechanism for said power device including a connection with the accelerator mechanism for causing the power device to be energized and disengage the clutch when the accelerator mechanism is released, means responsive to the degree of energization of the power device, and means controlled by said last-named means and the actuation of the accelerator mechanism from released condition for controlling the rate of re-engagement of the clutch to a predetermined point in the relative movement of its movable elements during re-engagement, and means controlled by said responsive means independently of movement of the accelerator mechanism for controlling the rate of re-engagement of the movable clutch elements after said predetermined point is reached.

2. In a vehicular drive system including a torque-producing internal-combustion engine having a clutch provided with friction elements relatively movable into and out of engaging contact for transmitting torque *when engaged* from the engine to an associated variable gear ratio transmission; the improvements which comprise a power device operably connected to one of the movable elements of the clutch, *a source of power to operatively energize said power device*, a [manually] *personally*-controlled member, control mechanism for said power device including a connection with the [manually] *personally*-controlled member for causing the power device to be energized and disengage the clutch when the [manually] *personally*-controlled member is in a predetermined position, means proportionately responsive to the energization of the power device when caused to be operative to disengage the clutch, and means jointly controlled by said last-named means and the [manually] *personally*-controlled member when moved from its predetermined position for controlling the rate of re-engagement of the clutch to a predetermined point in the movement of its movable elements toward operative engagement, and means controlled by said responsive means independent of any movement of the [manually] *personally*-controlled member for controlling the rate of re-engagement of the movable clutch elements after said predetermined point is reached.

3. In a vehicular drive system including a torque-producing internal-combustion engine having a clutch provided with friction elements relatively movable into and out of engaging contact for transmitting torque *when engaged* from the engine to an associated variable gear ratio transmission; the improvements which comprise a fluid pressure actuated motor operably connected to one of the movable clutch elements, a source of fluid pressure different from atmosphere, a [manually] *personally*-controlled control member, control valve means, valve means embodied in the control valve means for connecting the motor to the source when the [manually] *personally*-controlled member is in a predetermined position to thus cause the clutch to be disengaged, follow-up valve means embodied in the control valve means and having one element controlled by the [manually] *personally*-controlled member when moved from the predetermined position and another element so controlled in accordance with relative movement of the clutch elements toward engaged position that the clutch engaging movement will be in accordance with movement of the [manually] *personally*-controlled member, and means operable when the clutch engaging movement reaches a predetermined point for controlling the fluid motor so that the rate of engaging movement of the movable clutch elements will be controlled independently of movement of the [manually] *personally*-controlled member.

4. In a vehicular drive system including a torque-producing internal-combustion engine having a clutch provided with friction elements relatively movable into and out of engaging contact for transmitting torque *when engaged* from the engine to an associated variable gear ratio transmission; the improvements which comprise a fluid pressure actuated motor having a movable element operably connected to one of the movable clutch elements, a source of fluid pressure different from atmosphere, control valve means for the motor, a [manually] *personally*-controlled member, valve means embodied in the control valve means for connecting the source to the motor to cause disengagement of the clutch when the [manually] *personally*-controlled member is in a predetermined position and other valve means embodied in the control valve means for controlling the fluid motor for accommodating engagement of the clutch, said other valve means comprising a follow-up valve having one element *operably* connected for movement by the [manually] *personally*-controlled member and a second cooperating valve element movable in accordance with movement of the movable element of the motor, and means operable by the second-named cooperating valve element independently of movement of the said first-named valve element for controlling the rate of movement of the elements of the fluid motor after it reaches a predetermined point during clutch engagement as controlled by the functioning of the follow-up valve.

5. In a vehicular drive system including a torque-producing internal-combustion engine having a clutch provided with friction elements relatively movable into and out of engaging contact for transmitting torque *when engaged* from the engine to an associated variable gear ratio transmission; the improvements which comprise a fluid pressure actuated motor having a movable element operably connected to one of the movable clutch elements, a source of fluid pressure different from atmosphere, control valve means for the motor, a [manually] *personally*-controlled member, valve means embodied in the control valve means for connecting the source to the motor to cause disengagement of the clutch when the [manually] *personally*-controlled member is in a predetermined position and other valve means embodied in the control valve means for controlling the fluid motor for accommodating engagement of the clutch, said other valve means comprising a follow-up valve having one element operably connected for movement by the [manually] *personally*-controlled member and a second cooperating valve element mechanically connected to move in accordance with movement of the movable element of the motor, and means operable by the second cooperating valve element independently of movement of the said first-named valve element for controlling flow of de-energizing fluid to the motor and the rate of movement of the element of the fluid motor after it reaches a predetermined point during clutch re-engagement as controlled by the functioning of the follow-up valve.

6. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor having a movable element operably connected to one of the movable clutch elements, a *source of pressure fluid,* control valve mechanism for the fluid motor, means for controlling the valve mechanism by the accelerator mechanism so that the clutch will be disengaged when the accelerator mechanism is released, means embodied in the control valve mechanism and comprising a follow-up valve controllable by movement of the accelerator mechanism from released position and the differential fluid pressure effective in the fluid motor for controlling the re-engagement of the clutch, and other means including means associated with the valve mechanism and operable by the accelerator mechanism for causing the fluid motor to disengage the clutch when the accelerator mechanism is moved substantially at the end of the range where full engine operation is available, and means for causing the fluid motor to control the clutch elements into engaging contact independently of movement of the accelerator mechanism from its last-named position.

7. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor having a movable element operably connected to one of the movable clutch elements, a source of fluid pressure different from atmosphere, control valve means including two cooperating valve elements one of which is operably connected to be controlled by the accelerator mechanism and the second in accordance with movement of the movable element of the fluid motor, means controlled by the first-named valve element when the accelerator mechanism is released for connecting the fluid motor to the source and causing disengaging of the clutch, means operably associated with both valve elements to cause them to function as a follow-up valve to cause the fluid pressure to release the movable element of the fluid motor [and] *to* control movement of the movable clutch element toward engagement [as] *in accordance with movement of* the accelerator mechanism [is moved] from released position, and means associated with the first-named valve element and operable by the accelerator mechanism for connecting the motor to the source to cause clutch disengagement when the accelerator mechanism is moved to a position substantially at the end of its range where full engine operation is available.

8. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor having a movable element operably connected to one of the movable clutch elements, a source of fluid pressure different from atmosphere, control valve means including two cooperating valve elements one of which is operably connected to be controlled by the accelerator mechanism and the second in accordance with movement of the movable element of the fluid motor, means controlled by the first-named valve element when the accelerator mechanism is released for connecting the fluid motor to the source and causing disengaging of the clutch, means associated with both valve elements to cause them to function as a follow-up valve to cause the motor to release the fluid pressure [and] *to* control movement of the movable clutch element toward engagement [as] *in accordance with movement of* the accelerator mechanism [is moved] from released position, means associated with the first-named valve element and operable by the accelerator mechanism for connecting the motor to the source to cause clutch disengagement when the accelerator mechanism is moved to a depressed position substantially at the end of its range where full engine operation is available, and means effective to release the movable element of the fluid motor *to* control clutch engagement independently of function of the valve elements.

9. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise means including a fluid pressure actuated motor operable for relieving the engine torque through the gearing, *a source of pressure fluid,* control valve means including a movable valve element having two operating positions either of which causes operation of the motor to relieve the torque so that a change in gear ratio can be accomplished, means operable by the accelerator mechanism when in fully released position for placing the valve element in one position and when moved to a depressed position substantially at the end of its range where full engine operation is available for positioning the valve element in the other position, and means operable independently of movement of the accelerator mechanism for re-establishing torque transmitting conditions, said last-named means being ineffective to prevent subsequent relieving of the torque by operation of the accelerator mechanism to place the valve means in the position other than that employed in relieving the torque prior to its re-establishment.

10. In a vehicular drive system including a torque-producing internal-combustion engine having a clutch provided with friction elements relatively movable into and out of engaging contact for transmitting torque *when engaged* from the engine to an associated variable gear ratio transmission; the improvements which comprise a fluid pressure actuated motor operably connected to the clutch, a source of fluid pressure different from atmosphere, a control valve means including a movable valve element having two operative positions, a [manually] *personally*-controlled member, means operable by the [manually] *personally*-controlled member when in two predetermined positions for moving the element to its two operative positions and connecting the motor with the source to cause it to operate and disengage the clutch, and means operable independently of movement of the [manually] *personally*-controlled member from said predetermined positions for connecting the motor with atmosphere to disable the motor and effect clutch engagement, said last-named means being ineffective to prevent operation of a motor by a subsequent movement of the [manually] *personally*-controlled member.

11. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor operably connected to the clutch, a source of fluid pressure different from atmosphere, a control valve means including a movable element having two operative positions, means operable by the accelerator mechanism when in released position and in a depressed position substantially at the end of its range where full engine operation is available for obtaining the two valve operative positions and connecting the motor with the source to cause it to operate and disengage the clutch, and means operable independently of movement of the accelerator mechanism from either of its said positions for connecting the motor with atmosphere to disable the motor and effect clutch engagement, said last-named means being ineffective to prevent the motor from being again connected to the source by an operation of the accelerator mechanism.

12. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor operably connected to the clutch for relieving the engine torque transmittable to the vehicular wheels, a source of fluid pressure different from atmosphere, conduit means between the source and the motor, and control valve means for the conduit means including a casing having ports connected to the source and motor and a [slidable] *movable* valve element associated with the ports and controllable by the accelerator mechanism, said valve element being provided with separate passages for connecting the ports and one of said passages being in a position to connect the ports when the accelerator mechanism is in released position and the other being in a position to connect the ports when the accelerator mechanism is moved to a depressed position substantially at the end of its range where full engine operation is available.

13. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor operably connected to the clutch for relieving the engine torque transmittable to the vehicle wheels, a source of fluid pressure different from atmosphere, conduit means between the source and the motor, control valve means for the conduit means including a casing having ports connected to the source and motor and a [slidable] *movable* valve element associated with the ports and controllable by the accelerator mechanism, said valve element being provided with separate passages for connecting the ports and one of said passages being in a position to connect the ports when the accelerator mechanism is in released position and the other being in a position to connect the ports when the accelerator mechanism is moved to a depressed position substantially at the end of its range where full engine operation is available, a valve associated with the conduit means leading to the motor for connecting the conduit means with source through the control valve means or with the atmosphere, and means for controlling said last-named valve.

14. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a power device operably connected to control the clutch, *a source of power to operatively energize said power device*, control means for said power device including a solenoid-controlled control element, an electrical circuit for energizing the solenoid, a switch in said circuit, a second electrical circuit for energizing the solenoid, two switches for said second circuit, speed-responsive means for controlling the switch in the first-named circuit and one of the switches of the second-named circuit, said switch in the first-named circuit being closed when the vehicle speed is below a predetermined value and said switch in the second-named circuit being closed when the speed is above the predetermined value, and means for closing the other switch in the second-named circuit when the accelerator mechanism is in released condition.

15. In a vehicular drive system including a torque-producing internal-combustion engine having an accelerator mechanism for controlling a throttle valve and a clutch provided with friction elements relatively movable into and out of engaging contact for transmitting torque *when engaged* from the engine to an associated variable gear ratio transmission; the improvements which comprise a fluid pressure actuated motor having a movable element operatively connected to one of the movable clutch elements, a source of fluid pressure different from atmosphere, control valve means including two cooperating valve elements one of which is controllable by the accelerator mechanism and the second in accordance with movement of the movable elements of the fluid motor, means controlled by the first-named valve element when the accelerator mechanism is released for connecting the fluid motor to the source and causing disengaging of the clutch, means associated with both valve elements to cause them to function as a follow-up valve to cause the motor to release the fluid pressure and effect movement of the movable clutch element toward engagement as the accelerator mechanism is moved from released position, means associated with the first-named valve element for connecting the motor to the source to cause clutch disengagement when the accelerator mechanism is moved to a depressed position substantially at the end of its range where full engine operation is available, and means operable by the accelerator mechanism when moved to the last-named position for causing the engine to cease operation under the control of the throttle valve.

16. In a vehicular drive system including a torque-producing internal-combustion engine having an accelerator mechanism for controlling a throttle valve positioned in an intake manifold for the engine, and a clutch provided with friction elements for controlling a throttle valve relatively movable into and out of engaging contact for transmitting torque *when engaged* from the engine to an associated variable gear ratio transmission; the improvements which comprise a suction-actuated motor operably connected by conduit means to the intake-manifold, a control valve means for the suction motor including a valve element operably connected to the accelerator mechanism and disposed to be in open position when the accelerator is in released position, lost-motion connecting means in the accelerator mechanism for freeing the valve element to be moved to closed position by the accelerator mechanism before opening the throttle valve, and locking means operable when the lost-motion is taken up for positively causing the throttle valve to move in unison with the accelerator mechanism in either a throttle valve opening or closing direction.

17. In a vehicular drive system including a torque-producing internal-combustion engine having an accelerator mechanism for controlling a throttle valve positioned in an intake manifold for the engine, the accelerator mechanism including an arm and a link connected to the throttle valve and a clutch provided with frictional elements relatively movable into and out of engaging contact for transmitting torque *when engaged* from the engine to an associated variable gear ratio transmission; the improvements which comprise a suction-actuated motor operably connected by conduit means to the intake-manifold, control valve means for the suction motor including a valve element connected to be operated with the arm and disposed to be in open position when the accelerator mechanism is in released position, a lost-motion connection between the rod and arm to accommodate closing of the control valve element before opening the throttle valve, and a hook for positively connecting the rod and arm together to eliminate the lost-motion and cause movement in unison of the arm and rod, and means for moving said hook to operative position and maintaining it in such position after the lost-motion is taken up by movement of the arm to close the control valve element.

[18. In a vehicular drive system including a torque-producing internal-combustion engine having an accelerator mechanism and a clutch provided with friction elements relatively movable into and out of engaging contact for transmitting torque from the engine to an associated variable gear ratio transmission; the improvements which comprise a controllable power device operably connected to control the clutch, control means operable when the accelerator mechanism is released to cause said power device to disengage the clutch to accommodate a change in gear ratio and means operable following establishment of a predetermined gear ratio for automatically controlling the power device to control re-engagement of the clutch independently of operation of the accelerator mechanism.]

[19. In a vehicular drive system including a torque-producing internal-combustion engine having an accelerator mechanism and a clutch provided with friction elements relatively movable into and out of engaging contact for transmitting torque from the engine to an associated variable gear ratio transmission; the improvements which comprise a controllable power device operably connected to control the clutch, control means for the power device, means operable by release of the accelerator mechanism to so control the control means that the clutch will be disengaged by the power device to accommodate a change in gear ratio and by the movement of the accelerator mechanism from released position in an engine accelerating direction to accommodate clutch engagement by the power device, and means operable when a predetermined gear ratio is established while the clutch is disengaged for so controlling the power device that the clutch will be engaged independently of movement of the accelerator mechanism from released position.]

[20. In a vehicular drive system including a torque-producing internal-combustion engine having an accelerator mechanism and a clutch provided with friction elements relatively movable into and out of engaging contact for transmitting torque from the engine to an associated variable gear ratio transmission; the improvements which comprise a controllable power device operably connected to control the clutch, control means for the power device, means operable when the gearing is in a predetermined gear ratio and the accelerator mechanism is released for so controlling the control means that the power device will disengage the clutch whereby a change in gear ratio may be accomplished, means operable when the accelerator mechanism is moved from released position after a selected gear ratio is established for causing the control means to so control the power device that the clutch will have its rate of engagement controlled, and means operable when the gearing is in another gear ratio for causing the power device to automatically control the clutch into engagement without movement of the accelerator mechanism from the released position.]

[21. In a vehicular drive system including a torque-producing internal-combustion engine having a clutch provided with friction elements relatively movable into and out of engaging contact for transmitting torque from the engine to an associated variable gear ratio transmission; the improvements which comprise a fluid pressure actuated motor operably connected to the clutch, a source of fluid pressure different from atmosphere, a control valve means including a movable element, a manually-controlled member, means operable by the manually-controlled member when in either of two predetermined positions for connecting the motor with the source to cause it to operate and disengage the clutch, and means automatically operable when the gearing is placed in selected gear ratios with the clutch disengaged for connecting the motor to atmosphere thereby disabling the motor and controlling clutch engagement independently of movement of the manually-controlled member from either of said predetermined positions.]

[22. In a vehicular drive system including a torque-producing internal-combustion engine having an accelerator mechanism and a clutch provided with friction elements relatively movable into and out of engaging contact for transmitting torque from the engine to an associated variable gear ratio transmission; the improvements which comprise a fluid pressure actuated motor operably connected to the clutch, a source of fluid pressure different from atmosphere, a control valve means including a movable element having two operative positions, means operable by the accelerator mechanism when in released position and in a depressed position substantially at the end of its normal operating range to move the element to the two positions for connecting the motor with the source to cause it to operate and disengage the clutch, and means automatically operable when the gearing is placed in a predetermined gear ratio with the clutch disengaged for connecting the motor to atmosphere and thereby disable the motor and control clutch engagement independently of movement of the accelerator mechanism from either of its said positions.]

23. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor operable connected to the clutch and operable for relieving the engine torque through the gearing, *a source of pressure fluid,* control valve means including a movable valve element having two operative positions to cause operation of the motor and relieving of the torque, means operable by the accelerator mechanism when in fully released position for placing the valve element in one position and when in a depressed position substantially at the end of its range where full engine operation is available for positioning the valve element in the other position, and means controlled jointly by the fluid motor and the operation of the accelerator mechanism for automatically changing the gear ratio of the gearing when the accelerator mechanism is in one of the said positions.

[24. In a vehicular drive system including a torque-producing internal-combustion engine having an accelerator mechanism and a clutch provided with friction elements relatively movable into and out of engaging contact for transmitting torque from the engine to an associated variable gear ratio transmission; the improvements which comprise a fluid pressure actuated motor operably connected to the clutch and operable for relieving the engine torque through the gearing, control valve means, means operable by the accederator mechanism when moved to a depressed position substantially at the end of its range where full engine operation is available for so controlling the control valve means as to cause the fluid motor to relieve the torque being transmitted through the gearing, other means controlled by the accelerator mechanism when in its said depressed position for causing a change in gear ratio following relief of the torque as aforesaid, and means for re-establishing torque transmitting conditions following the establishment of the new gear ratio and independently of release of the accelerator mechanism from its position causing releasing of the torque.]

25. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a single power device operable for disengaging the clutch, *a source of power to operatively energize said power device,* control means for causing operation of the power device including means operable by the accelerator mechanism when moved to a position substantially at the end of its range where full engine operation is available to cause the power device to operatively disengage the clutch, and other means operable by the accelerator mechanism when moved to the said position at the end of its range for establishing a mechanical connection between the power device and the gearing, if in a predetermined gear ratio, effective for automatically establishing another gear ratio upon operation of the power device *to disengage the clutch.*

26. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a single power device operable for disengaging the clutch, *a source of power to operatively energize said power device,* control means for causing operation of the power device including means operable by the accelerator mechanism when moved to a depressed position substantially at the end of its range where full engine operation is available to cause the power device to operatively disengage the clutch, other means operable by the accelerator mechanism when moved to the said depressed position for establishing a mechanical connection between the power device and the gearing, if in a predetermined gear ratio, effective for automatically establishing another gear ratio upon operation of the power device to *disengage the clutch,* and means for disabling the power device to accommodate re-engagement of the clutch independently of movement of the accelerator mechanism from its said depressed position.

27. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a single power device operable for disengaging the clutch,

*a source of power to operatively energize said power device,* control means for causing operation of the power device including means operable by the accelerator mechanism when moved to a position substantially at the end of its range where full engine operation is available to cause the power device to operatively disengage the clutch, means operable by the accelerator mechanism when so positioned for cutting off the fuel supply to the engine, and other means operable by the accelerator mechanism when moved to said position substantially at the end of its range for establishing a mechanical connection between the power device and the gearing, if in a predetermined gear ratio, effective for automatically establishing another gear ratio upon operation of the power device *to disengage the clutch.*

[28. In a vehicular drive system including a torque-producing internal-combustion engine having an accelerator mechanism for controlling a throttle valve and a clutch provided with friction elements relatively movable into and out of engaging contact for transmitting torque from the engine to an associated variable gear ratio transmission; the improvements which comprise a single power device operable for disengaging the clutch, control means for causing operation of the power device, means operable by the accelerator mechanism when moved to a position substantially at the end of its range where full engine operation is available to control the control means and cause the power device to operatively disengage the clutch, means for rendering throttle valve control of the engine ineffective when the accelerator mechanism assumes its said clutch disengaging position, means for changing selected gear ratios by operation of the power device after clutch disengagement, and means operable by the accelerator mechanism just prior to assuming its said position for causing operation of the control means to cause clutch disengagement for so conditioning the last-named means for operation that the changing of gear ratio will occur.]

[29. In a vehicular drive system including a torque-producing internal-combustion engine having an accelerator mechanism and a clutch provided with friction elements relatively movable into and out of engaging contact for transmitting torque from the engine to an associated variable gear ratio transmission; the improvements which comprise a fluid pressure actuated motor operably connected to the clutch and means for relieving the engine torque through the gearing, a source of pressure fluid, control valve means for said motor, means operable by the accelerator mechanism when moved to a position substantially at the end of its range where full engine operation is available for so controlling the control valve means as to cause operation of said motor to relieve the torque being transmitted through the gearing, other means automatically operable following a relieving of the torque for causing a change in gear ratio, and means for reestablishing torque transmitting conditions when the new gear ratio is established and independently of release of the accelerator mechanism from its said position causing relieving of the torque.]

[30. In a vehicular drive system including a torque-producing internal-combustion engine having an accelerator mechanism and a clutch provided with friction elements relatively movable into and out of engaging contact for transmitting torque from the engine to an associated variable gear ratio transmission; the improvements which comprise a controllable power device operably connected to control the clutch, control means for causing operation of the power device, means operable when the gearing is in a predetermined gear ratio and the accelerator mechanism is moved to a position substantially at the end of its range where full engine operation is available for so operating the control means that the power device will operate to disengage the clutch and change the gear ratio of the gearing, and means operable upon said change in the gear ratio for automatically causing the fluid motor to accommodate clutch engagement independently of movement of the accelerator mechanism.]

31. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise an energizable power device operably connected to the movable elements of the clutch, energizing means for said power device, control means for causing operation of said power device including a mechanical connection with the accelerator mechanism for causing the power device to be energized and disengage the clutch when the accelerator mechanism is released and when the accelerator mechanism is moved to a position substantially at the end of its range where full engine operation is available, means embodied in the control means and functioning when the gearing is in predetermined gear ratios for causing the power device to control movements of the clutch elements toward engaged condition when the accelerator mechanism is moved from released position in an engine accelerating direction, means operable independently of the movement of the accelerator mechanism and functioning after a point is reached in the re-engaging movement of the clutch elements for controlling the rate of movement of the clutch to full engaged condition, and means automatically operable by the placing of the gearing in other predetermined gear ratios for deenergizing the power device and accommodating full engagement of the clutch without movement of the accelerator mechanism from the position causing energization of the power device.

32. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor operably connected to the clutch for relieving the engine torque transmittable therethrough to the transmission, a source of fluid pressure different from atmosphere, conduit means between the source and the motor, control valve means interposed in the conduit means including a casing having ports connected to the source and motor and a slidable valve element associated with the ports and controllable by the accelerator mechanism, said valve element being provided with separate passages for connecting the ports and one of said passages being in a position to connect the ports when the accelerator mechanism is in released position and the other being in a position to connect the ports when the accelerator mechanism is moved to a position substantially at the end of its range where full engine operation is available, another valve associated with the conduit means leading to the motor for connecting the conduit means with the source through the control valve means or with the atmosphere, and means for controlling said last-named valve in accordance with predetermined conditions of the gearing.

33. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise a fluid pressure actuated motor operably connected to the clutch for relieving the engine torque transmittable to the transmission, a source of fluid pressure different from atmosphere, conduit means between the source and the motor, control valve means interposed in said conduit means including a casing having ports connected to the source and motor and a slidable valve element associated with the ports and controllable by the accelerator mechanism, said valve element being provided with separate passages for connecting the ports and one of said passages being in a position to connect the ports when the accelerator mechanism is in released position and the other being in a position to connect the ports when the accelerator mechanism is moved to a position substantially at the end of its range where full engine operation is available, another valve associated with the conduit means leading to the motor for connecting the conduit means with source through the control valve means or with the atmosphere, and means for controlling said last-named valve so that it will connect the motor to atmosphere when a high gear ratio is established or when a second gear ratio is established after the accelerator mechanism is moved to its position beyond normal engine operating range.

34. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprises a fluid pressure actuated motor operably connected to control the clutch, a source of fluid pressure different from atmosphere, control means for causing operation of the fluid motor including a solenoid-controlled valve for connecting and disconnecting the source from the motor, an electrical circuit *including a source of electrical energy* for energizing the solenoid and opening the valve, a switch in said circuit, a second electrical circuit for energizing the solenoid, two switches for said second circuit, speed-responsive means for controlling the switch in the first-named circuit and one of the switches of the second-named circuit, said switch in the first-named circuit being closed when the vehicle speed is below a predetermined value and said switch in the second-named circuit being closed when the speed is above the predetermined value, and means for closing the other switch in the second-named circuit when the accelerator mechanism is in released condition.

35. In a vehicular drive system including a torque-producing internal-combustion engine having an accelerator mechanism and a clutch provided with friction elements relatively movable into and out of engaging contact for transmitting torque *when engaged* from the engine to an associated variable gear ratio transmission; the improvements which comprise an energizable power device operably connected to control the clutch, energizing means for said power device, control means for causing operation of said power device including a solenoid-controlled control element, an electrical circuit *including a source of electrical energy* for energizing the solenoid, a switch in said circuit, a second electrical circuit for energizing the solenoid, three switches for said second-named circuit, speed-responsive means for controlling the switch in the first-named circuit and one of the switches of the second-named circuit, said switch in the first-named circuit being closed when the vehicle speed is below a predetermined value and said switch in the second-named circuit being closed when the speed is above the predetermined value, means for closing one of the other two switches in the second-named circuit when the accelerator mechanism is in released condition, and means for causing the second of the other two switches to be opened when a predetermined gear ratio of the transmission is established.

*36. In a vehicular drive system including a torque producing internal-combustion engine controlled by an operatable accelerator mechanism, and a clutch provided with friction elements relatively movable into and out of engaging contact for transmitting and interrupting, respectively, torque from the engine to an associated variable-gear ratio transmission: the improvements which comprise a controllable power-mechanism operably connected to control the clutch and certain gear ratios of the transmission; means operable independently of the power-mechanism for selectively controlling all of the transmission gear ratios; a source of power to operatively energize the said power-mechanism; control means operable in response to operation of the accelerator mechanism into released engine idling position to cause said power-mechanism to operatively disengage the clutch to accommodate selective establishment of the different gear ratios by operation of the independently operable means; means operable conjointly with the operation of said control means in response to operating the accelerator mechanism substantially to wide open throttle position following the establishment of a predetermined gear ratio by said independently operable means, for causing the power-mechanism to disengage the clutch, to effect a predetermined gear ratio change, and to control re-engagement of the clutch.*

*37. A vehicular drive system according to claim 36 wherein the independently operable means comprises a manually-operatable shifting mechanism for selectively controlling the transmission.*

*38. A vehicular drive system according to claim 37 wherein the said transmission comprises a plurality of forward driving gear ratios, a reverse drive gear ratio and a common neutral non-driving condition.*

*39. A vehicular drive system according to claim 36 wherein the control means includes a governor device responsive to the speed of the vehicle whereby said governor is operable to a low and a high stage controlling position to cause the power-mechanism to operate to control the clutch and transmission in the manner described with the accelerator mechanism operated into engine idling position and wide open throttle position, respectively.*

*40. A vehicular drive system according to claim 36 wherein the last-named means comprises a pre-settable element responsive to operating the accelerator mechanism substantially to wide open throttle position for operatively interconnecting the power-mechanism with the said independently operable means to operate the same when energized to effect the said predetermined gear ratio change.*

*41. A vehicular drive system according to claim 36 wherein the said control means comprises two correlated movable elements responsive to predetermined operations of the accelerator mechanism and the degree of energization of said power-mechanism as defined by such accelerator operations.*

GLENN T. RANDOL.

References Cited in the file of this patent or the original patent

UNITED STATES PATENTS

| Number | Name | Date |
|---|---|---|
| 2,031,716 | Kliesrath | Feb. 25, 1936 |
| 2,049,738 | Hill et al. | Aug. 4, 1936 |
| 2,058,586 | Heiss et al. | Oct. 27, 1936 |
| 2,071,983 | McCollum et al. | Feb. 23, 1937 |
| 2,087,370 | Bragg | July 20, 1937 |
| 2,132,721 | Clarke | Oct. 11, 1938 |
| 2,219,269 | McCollum et al. | Oct. 22, 1940 |
| 2,263,400 | Schwarz | Nov. 18, 1941 |
| 2,296,282 | Hruska | Sept. 22, 1942 |
| 2,346,149 | Brewer | Apr. 11, 1944 |
| 2,346,535 | Brewer | Apr. 11, 1944 |
| 2,348,435 | Hey et al. | May 9, 1944 |